US007532660B2

(12) United States Patent
Chae et al.

(10) Patent No.: US 7,532,660 B2
(45) Date of Patent: May 12, 2009

(54) SYSTEM AND METHOD FOR TRANSMITTING /RECEIVING A SIGNAL IN A MOBILE COMMUNICATION SYSTEM USING A MULTIPLE INPUT MULTIPLE OUTPUT ADAPTIVE ANTENNA ARRAY SCHEME

(75) Inventors: Chan-Byoung Chae, Seoul (KR);
Chang-Ho Suh, Seoul (KR);
Young-Kwon Cho, Suwon-si (KR);
Byoung-Yun Kim, Suwon-si (KR);
Jung-Min Ro, Seoul (KR)

(73) Assignee: Samsung Electronics Co., Ltd (KR)

( * ) Notice: Subject to any disclaimer, the term of this patent is extended or adjusted under 35 U.S.C. 154(b) by 644 days.

(21) Appl. No.: 10/898,777

(22) Filed: Jul. 26, 2004

(65) Prior Publication Data
US 2005/0018755 A1    Jan. 27, 2005

(30) Foreign Application Priority Data
Jul. 26, 2003    (KR) .................... 10-2003-0051830

(51) Int. Cl.
*H04B 1/69* (2006.01)
(52) U.S. Cl. .................................... 375/144
(58) Field of Classification Search ................. 375/144, 375/130, 146, 147, 148, 347; 455/562.1, 455/561, 65
See application file for complete search history.

(56) References Cited
U.S. PATENT DOCUMENTS

2003/0060173 A1* 3/2003 Lee et al. ..................... 455/103
2004/0076124 A1* 4/2004 Agrawal et al. ............. 370/310
2005/0020313 A1* 1/2005 Chae et al. ................ 455/562.1

* cited by examiner

*Primary Examiner*—Khai Tran
(74) *Attorney, Agent, or Firm*—The Farrell Law Firm, PC

(57) ABSTRACT

Disclosed are a method and a system for transmitting/receiving signals in a mobile communication system using a multiple input multiple output adaptive antenna array scheme. A first receiver calculates a reception weight value by using a de-spread signal of a reception signal for creating a reception beam of the first receiver and calculates a transmission weight value by using the calculated reception weight value for creating a transmission beam of the second transmitter, thereby creating feedback information including the transmission weight value. A first transmitter transmits the feedback information to a second receiver. The second receiver receives the feedback information and the second transmitter detects the transmission weight value from the feedback information received in the second receiver, and creates the transmission beam corresponding to the detected transmission weight value in order to transmit a signal by applying the transmission beam to the signal.

17 Claims, 12 Drawing Sheets

SYSTEM AND METHOD FOR TRANSMITTING /RECEIVING A SIGNAL IN A MOBILE COMMUNICATION SYSTEM USING A MULTIPLE INPUT MULTIPLE OUTPUT ADAPTIVE ANTENNA ARRAY SCHEME

PRIORITY

This application claims priority to an application entitled "System And Method For Transmitting/Receiving Signal In Mobile Communication System Using Multiple Input Multiple Output Adaptive Antenna Array Scheme" filed with the Korean Intellectual Property Office on Jul. 26, 2003 and assigned Ser. No. 2003-51830, the contents of which are incorporated herein by reference.

BACKGROUND OF THE INVENTION

1. Field of the Invention

The present invention relates to a mobile communication system, and more particularly to a system and a method for transmitting/receiving signals in a mobile communication system using a multiple input multiple output adaptive antenna array scheme.

2. Description of the Related Art

Packet service communication systems have been developed as next-generation mobile communication systems. Such packet service communication systems transmit burst packet data to a plurality of mobile stations and are adaptable to transmit mass storage data. Recently, various packet service communication systems are being developed in order to provide a high-speed packet service. The 3GPP ($3^{rd}$ Generation Partnership Project), which is a consortium established for providing the asynchronous telecommunication system standards, has suggested a high-speed downlink packet access (hereinafter, simply referred to as "HSDPA") scheme for providing the high-speed packet service. In addition, the 3GPP2 ($3^{rd}$ Generation Partnership Project2), which is a consortium established for providing the synchronous telecommunication system standards, has suggested a 1× EV-DO/V (1× Evolution Data Only/Voice) scheme for providing the high-speed packet service. Both HSDPA and 1× EV-DO/V schemes suggest utilizing the high-speed packet service in order to easily transmit Internet services, such as web services. When providing such a high-speed packet service, a peak throughput as well as an average throughput must be optimized in order to easily transmit packet data and circuit data, such as voice services.

In particular, in order to allow a communication system using the HSDPA scheme (hereinafter, simply referred to as "HSDPA communication system") to transmit the high-speed packet data, three schemes are newly provided for the HSDPA communication system. The three new schemes include an adaptive modulation and coding (hereinafter, simply referred to as "AMC") scheme, a hybrid automatic retransmission request (hereinafter, simply referred to as "HARQ") scheme, and a fast cell select (hereinafter, simply referred to as "FAC") scheme. The HSDPA communication system improves a data transmission rate thereof by using the AMC scheme, the HARQ scheme and the FCS scheme. The HSDPA communication system has been described herein as an example, and a communication system using a 1× EV-DO/V scheme (hereinafter, simply referred to as "1× EV-DO/V communication system") may be provided in order to improve the data transmission rate. In order to improve performance of the 1× EV-DO/V communication system, the data transmission rate thereof must be increased. Besides the above new schemes, such as the AMC scheme, the HARQ scheme and the FCS scheme, a multiple antenna scheme can be used in order to increase the data transmission rate while overcoming a limitation of an assigned bandwidth. Such a multiple antenna scheme utilizes a space domain in order to overcome the limitation of bandwidth resources in a frequency domain.

Hereinafter, the multiple antenna scheme will be described.

Firstly, a mobile communication system is constructed such that it communicates with a plurality of mobile stations through a base station. If the base station transmits high-speed data to the mobile stations, a fading phenomenon may occur due to the characteristics of a radio channel. In order to overcome the fading phenomenon, a transmission antenna diversity scheme, which is a multiple antenna scheme, has been suggested. According to the transmission antenna diversity scheme, signals are transmitted through at least two antennas, such that a transmission loss of the data caused by the fading phenomenon can be minimized, thereby increasing the data transmission rate.

In general, and different from a wired channel environment, a radio channel environment existing in a mobile communication system is subject to various parameters, such as a multipath interference, shadowing, wave attenuation, noise and interference. This being the case, a radio channel may receive a signal which has been distorted from the original transmission signal. The fading phenomenon caused by the multipath interference is closely related to the mobility of a mobile station, and the radio channel may receive a transmission signal mixed with an interference signal due to the fading phenomenon. Thus, the signal received in the radio channel is distorted from the original transmission signal so that performance of the mobile communication system is deteriorated. The fading phenomenon may distort amplitude and phase of the signal received over the radio channel, so the fading phenomenon becomes a main factor interfering with the high-speed data communication in the radio channel environment. Various studies and extensive research have been carried out in order to solve the fading phenomenon. In order to transmit high-speed data in the mobile communication system, it is necessary to minimize the loss derived from the characteristics of the mobile communication channel, such as the fading phenomenon, and the interference of the users. In order to prevent an unstable communication caused by the fading phenomenon, various diversity schemes are adopted in the mobile communication system. One such diversity schemes is a space diversity scheme which uses multiple antennas.

A transmission antenna diversity scheme has been suggested in order to effectively solve the fading phenomenon. According to the transmission antenna diversity scheme, a radio channel receives a plurality of transmission signals, which have experienced the fading phenomenon, in order to correct for the distortion of signals caused by the fading phenomenon. The transmission antenna diversity scheme includes a time diversity scheme, a frequency diversity scheme, a multipath diversity scheme, and a space diversity scheme. In order to transmit the high-speed data, the mobile communication system must reduce the fading phenomenon that exerts a negative influence on the performance of the mobile communication system. The fading phenomenon may reduce an amplitude of a signal from a few decibels to tens of decibles. Thus, the diversity scheme is used in order to solve the above fading phenomenon. For instance, a code division multiple access (hereinafter, referred to as "CDMA") scheme adopts a rake receiver capable of obtaining a diversity function by using a delay spread of a channel. Herein, the rake receiver is a reception diversity type receiver capable of receiving a multi-path signal. However, the reception diversity type rake receiver is disadvantageous in that it cannot obtain a required diversity gain if a channel has a relatively small delay spread.

The time diversity scheme can effectively deal with a burst error occurring in a radio channel environment by using interleaving and coding schemes. Generally, the time diversity scheme is used in a Doppler spread channel. However, according to the above time diversity scheme, a diversity effect is reduced in a low-speed Doppler spread channel. The space diversity scheme is generally used in a channel having a relatively small delay spread. For example, the space diversity scheme is used in an indoor channel and a pedestrian channel, which is a low-speed Doppler spread channel. According to the space diversity scheme, at least two antennas are used for obtaining a diversity gain. If a signal transmitted through one antenna is attenuated due to a fading phenomenon, a signal transmitted through the other antenna is received in the channel, thereby obtaining the diversity gain. Herein, the space diversity scheme is divided into a reception antenna diversity scheme using a plurality of reception antennas, a transmission antenna diversity scheme using a plurality of transmission antennas, and a multiple input multiple output (hereinafter, simply referred to as MIMO) scheme using a plurality of reception antennas and a plurality of transmission antennas.

Hereinafter, an MIMO-adaptive antenna array (hereinafter, simply referred to as "MIMO-AAA") scheme, which is one of the transmission/reception antenna diversity schemes, will be described.

According to the MIMO-AAA scheme, signals are received through an antenna array including a plurality of reception antennas, and predetermined weight vectors are applied to signal vectors of the received signals in such a manner that the intensity of the desired signals transmitted to a receiver in a particular transmission direction can be maximized, and the intensity of any undesired signals transmitted to the receiver in an improper transmission direction, that is, the intensity of any undesired signals improperly transmitted to the receiver, can be minimized. In addition, the receiver transmits a signal to a transmitter after calculating a transmission weight vector for the signal, so that a beam of a signal transmitted to the receiver from the transmitter can be effectively recreated. That is, according to the above MIMO-AAA scheme, only a required signal is maximally amplified when the signal is received in the receiver, and the signal is radiated toward the receiver with a maximum intensity, so that the speech quality can be improved and service areas can be enlarged.

Although the above MIMO-AAA scheme can be adapted for various mobile communication systems using a frequency division multiple access (hereinafter, simply referred to as "FDMA") scheme, a time division multiple access (hereinafter, simply referred to as "TDMA") scheme, or a code division multiple access (hereinafter, simply referred to as "CDMA") scheme, the MIMO-AAA scheme will be described in relation to a mobile communication system using the CDMA scheme (hereinafter, simply referred to as "CDMA mobile communication system") for convenience of explanation.

Hereinafter, the elements of a transmitter and a receiver of a CDMA mobile communication system will be described with reference to FIG. 1.

FIG. 1 is a block diagram of a transmitter and a receiver of a general CDMA mobile communication system.

Prior to explaining FIG. 1, it is noted that the following description is made on the assumption that the CDMA mobile communication system adopts an MIMO-AAA scheme. Accordingly, the transmitter and the receiver must have a plurality of transmission antennas and a plurality of reception antennas, respectively. However, according to FIG. 1, the transmitter and the receiver do not have separate transmission antennas and reception antennas, but the same antennas are used for both the transmitter and the receiver through a time division scheme by using a duplexer. In addition, according to FIG. 1, an N-number of antennas is used. Furthermore, the transmitter and the receiver may be a base station or a mobile station.

Hereinafter, the transmitter of the CDMA mobile communication system will be described.

Referring to FIG. 1, the transmitter includes an encoder 101, an interleaver 103, a transmission beam generator 105, a signal processor 107, a plurality of spreaders including a first to $N^{th}$ spreaders 111, 121, . . . , and 131, and an N-number of radio frequency (hereinafter, simply referred to as "RF") processors including a first to $N^{th}$ RF processors 113, 123, . . . , and 133. In addition, a duplexer 140 is commonly used for both the transmitter and the receiver and an N-number of antennas including a first to $N^{th}$ antennas 141, 143, . . . , and 145 are also commonly used for both the transmitter and the receiver.

Firstly, if data to be transmitted is created, the data is input into the encoder 101. The encoder 101 encodes the data using a predetermined encoding method, and outputs a signal to the interleaver 103. Herein, the encoding method includes a turbo encoding method or a convolutional encoding method. Upon receiving the signal from the encoder 101, the interleaver 103 interleaves the signal through a predetermined interleaving method in order to prevent a burst error, and outputs the signal to the transmission beam generator 105. Herein, the signal output from the interleaver 103 is represented as "$z'_k$". Then, the signal processor 107 calculates a weight value based on the signal $z'_k$ output from the interleaver 103 and outputs the signal to the transmission beam generator 105. Then, the transmission beam generator 105 generates a transmission beam by taking into considering the signal $z'_k$ output from the interleaver 103 and the weight value calculated in the signal processor 107, and outputs the transmission beam to the first to $N^{th}$ spreaders 111, 121, . . . , and 131. That is, the transmission beam generator 105 receives the signal output from the interleaver 103, creates the transmission beam, and transmits the transmission beam to each of the first to $N^{th}$ spreaders 111, 121, . . . , and 131 in such a manner that the transmission beam can be transmitted through each of the first to $N^{th}$ antennas 141, 143, . . . , and 145. Herein, a procedure for creating the transmission beam does not directly relate to the present invention, so a detailed description thereof will be omitted.

A set of signals output from the transmission beam generator 105 is represented as "$\underline{y}_k'$". That is, $\underline{y}_k'$ is a set of signals generated from the transmission beam generator 105 and mapped to a $k^{th}$ antenna.

The first spreader 111 receives a signal $\underline{y}_1'$ outputted from the transmission beam generator 105 and spreads the signal $\underline{y}_1'$ by using a predetermined spreading code. After that, the first spreader 111 outputs the signal $\underline{y}_1'$ to the first RF processor 113. Upon receiving the signal from the first spreader 111, the first RF processor 113 performs an RF-treatment process with respect to the signal and outputs the signal to the duplexer 140. Herein, each of the RF processors includes an amplifier, a frequency converter, a filter, and an analog-to-digital converter so as to process the RF signals. In addition, the second spreader 121 receives a signal $\underline{y}_2'$ output from the transmission beam generator 105 and spreads the signal $\underline{y_2}'$ by using a predetermined spreading code. After that, the second spreader 121 outputs the signal $\underline{y_2}'$ to the second RF processor 123. Upon receiving the signal from the second spreader 121, the second RF processor 123 performs an RF-treatment process with respect to the signal and outputs the signal to the duplexer 140. In the same manner, the $N^{th}$ spreader 131 receives a signal $\underline{y_N}'$ output from the transmission beam generator 105 and spreads the signal $\underline{y_N}'$ by using a predetermined spreading code. After that, the $N^{th}$ spreader 131 outputs the signal $\underline{y_N}'$ to the $N^{th}$ RF processor 133. Upon receiving the signal from the $N^{th}$ spreader 131, the $N^{th}$ RF processor 133 performs an RF-treatment process with respect to the signal and outputs the signal to the duplexer 140.

The duplexer 140 controls the signal transmission/reception operations by scheduling a transmission point and a receiving point of the signal under the control of a controller (not shown). In addition, the first to $N^{th}$ antennas 141, 143, ..., and 145 can be operated as transmission antennas (Tx. ANT) or reception antennas (Rx. ANT) according to the signal transmission/reception operations of the duplexer 140.

Hereinafter, the receiver of the base station of the CDMA mobile communication system will be described.

The receiver includes an N-number of RF processors including a first to $N^{th}$ RF processors 151, 161, ..., and 171, an N-number of multipath searchers including a first to $N^{th}$ multipath searchers 153, 163, ..., 173 corresponding to the RF processors, an L-number of fingers including a first to $L^{th}$ fingers 180-1, 180-2, ..., 180-L for processing signals regarding an L-number of multipaths, which are searched by the multipath searchers, a multipath combiner 191 for combining multipath signals output from the L-number of fingers, a de-interleaver 193, and a decoder 195.

Firstly, the signals transmitted from a plurality of transmitters are received in the N-number of antennas through a multipath fading radio channel. The duplexer 140 outputs the signal received through the first antenna 141 to the first RF processor 151. Upon receiving the signal from the duplexer 140, the first RF processor 151 performs an RF-process with respect to the signal to convert the signal into a baseband digital signal. Then, the first RF processor 151 sends the baseband digital signal to the first multipath searcher 153. Upon receiving the baseband digital signal from the first RF processor 151, the first multipath searcher 153 divides the baseband digital signal into an L-number of multipath components and outputs the multipath components to the first to $L^{th}$ fingers 180-1, 180-2, ..., 180-L, respectively. Herein, each of the first to $L^{th}$ fingers 180-1, 180-2, ..., 180-L is mapped with each of the L-number of multipaths on a one-to-one basis to process the multipath components. Since the L-number of multipaths must be considered in relation to each signal received through the N-number of reception antennas, the signal process must be carried out with respect to an N×L number of signals. Among the N×L number of signals, signals having the same path are output to the same finger.

In addition, the duplexer 140 outputs the signal received through the second antenna 143 to the second RF processor 161. Upon receiving the signal from the duplexer 140, the second RF processor 161 RF processes the signal to convert the signal into a baseband digital signal. Then, the second RF processor 161 sends the baseband digital signal to the second multipath searcher 163. Upon receiving the baseband digital signal from the second RF processor 161, the second multipath searcher 163 divides the baseband digital signal into an L-number of multipath components and outputs the multipath components to the first to $L^{th}$ fingers 180-1, 180-2, ..., 180-L, respectively.

In the same manner, the duplexer 140 outputs the signal received through the $N^{th}$ antenna 145 to the $N^{th}$ RF processor 171. Upon receiving the signal from the duplexer 140, the $N^{th}$ RF processor 171 performs an RF processes to convert the signal into a baseband digital signal. Then, the $N^{th}$ RF processor 171 sends the baseband digital signal to the $N^{th}$ multipath searcher 173. Upon receiving the baseband digital signal from the $N^{th}$ RF processor 171, the $N^{th}$ multipath searcher 173 divides the baseband digital signal into an L-number of multipath components and outputs the multipath components to the first to $L^{th}$ fingers 180-1, 180-2, ..., 180-L, respectively.

In this manner, among the signals received through the N-number of antennas, L multipath signals are input into the same finger. For instance, first multipath signals of the first to $N^{th}$ antennas 141 to 145 are input into the first finger 180-1, and the $L^{th}$ multipath signals of the first to $N^{th}$ antennas 141 to 145 are input into the $L^{th}$ finger 180-L. In the meantime, the first to $L^{th}$ fingers 180-1 to 180-L have the same structure and operational property even though different signals are inputted/outputted to/from the first to $L^{th}$ fingers 180-1 to 180-L. Thus, only the structure and operation of the first finger 180-1 will be described below as an example.

The first finger 180-1 includes an N-number of de-spreaders including first to $N^{th}$ de-spreaders 181, 182, ..., and 183 corresponding to the N-number of multipath searchers, a signal processor 184, for receiving signals output from the first to $N^{th}$ de-spreaders 181 to 183 and calculating weight values thereof so as to create a reception beam, and a reception beam generator 185, for creating the reception beam based on the weight values calculated by the signal processor 184.

Firstly, a first multipath signal output from the first multipath searcher 153 is input into the first de-spreader 181. Upon receiving the first multipath signal, the first de-spreader 181 de-spreads the first multipath signal by using a predetermined de-spreading code and outputs the first multipath signal to the signal processor 184 and the reception beam generator 185. Herein, the de-spreading code is identical to the spreading code used in each transmitter and the de-spreading process is referred to as "time processing". In addition, the first multipath signal output from the second multipath searcher 163 is input into the second de-spreader 182. Upon receiving the first multipath signal, the second de-spreader 182 de-spreads the first multipath signal by using a predetermined de-spreading code and outputs the first multipath signal to the signal processor 184 and the reception beam generator 185. In the same manner, a first multipath signal output from the $N^{th}$ multipath searcher 173 is inputted into the $N^{th}$ de-spreader 183. Upon receiving the first multipath signal, the $N^{th}$ de-spreader 183 de-spreads the first multipath signal by using a predetermined de-spreading code and outputs the first multipath signal to the signal processor 184 and the reception beam generator 185.

The signal processor 184 receives signals output from each of the first to $N^{th}$ de-spreaders 181 to 183 and calculates a set of weight values $\underline{w}_k$ for creating the reception beam. Herein, a set of the first multipath signals output from the first to $N^{th}$ multipath searchers 153 to 173 is defined as "$\underline{x}_k$". That is, "$\underline{x}_k$" represents a set of the first multipath signals received at a $k^{th}$ point through the first to $N^{th}$ antennas 141 to 145. All of the first multipath signals forming the first multipath signal set "$\underline{x}_k$" are vector signals. In addition, $\underline{w}_k$ represents a set of weight values to be applied to each of the first multipath signals received at the $k^{th}$ point through the first to $N^{th}$ antennas 141 to 145. All of the weight values forming the weight value set $\underline{w}_k$ are vector signals.

In addition, a set of de-spread signals of the first multipath signals forming the first multipath signal set "$\underline{x}_k$" is defined as "$\underline{y}_k$". Herein, "$\underline{y}_k$" represents a set of de-spread signals of the first multipath signals received at a $k^{th}$ point through the first to $N^{th}$ antennas 141 to 145. All of the de-spread signals forming the de-spread signal set $\underline{y}_k$ are vector signals. For the purpose of convenience of explanation, the term "set" will be omitted below. It is noted that the parameters having an underscore mark represent a set of specific elements.

In addition, since the first to $N^{th}$ de-spreaders 181 to 183 de-spread the first multipath signals $\underline{x}_k$ by using the predetermined de-spreading code, the power of the desired signal received through the proper transmission direction can be amplified by a process gain as compared with the power of an interference signal.

Meanwhile, as described above, the de-spread signals $\underline{y}_k$ of the first multipath signals $\underline{x}_k$ are input into the signal processor 184. The signal processor 184 calculates the weight values $\underline{w}_k$ based on the de-spread signals $\underline{y}_k$ of the first multipath signals $\underline{x}_k$ and outputs the weight values $\underline{w}_k$ to the reception beam generator 185. That is, the signal processor 184 calculates an N-number of weight values $\underline{w}_k$ applied to the first multipath signals $\underline{x}_k$ output from the first to $N^{th}$ antennas 141 to 145 by using the de-spread signals $\underline{y}_k$ of the N-number of first multipath signals $\underline{x}_k$. The reception beam generator 185 receives the de-spread signals $\underline{y}_k$ of the N-number of first multipath signals $\underline{x}_k$ and the N-number of the weight values $\underline{w}_k$. In addition, the reception beam generator 185 creates the reception beam by using the N-number of the weight values $\underline{w}_k$. After that, the reception beam generator 185 outputs a signal as an output signal $z_k$ of the first finger 180-1 by combining the de-spread signals $\underline{y}_k$ of the N-number of the first multipath signals $\underline{x}_k$ with the weight values $\underline{w}_k$ of the reception beams. Herein, the output signal $z_k$ of the first finger 180-1 may be represented as follows in Equation 1.

$$z_k = \underline{w}_k^H \underline{y}_k \quad (1)$$

The above Equation 1 represents a Hermitian operator, that is, a transpose of a conjugate. In addition, $\underline{z}_k$, which is a set of output signals $\underline{z}_k$ output from the N-number of fingers of the receiver, is finally input into the multipath combiner 191.

Even though only the operation of the first finger 180-1 has been described above as an example, the other fingers may operate in the same manner as the first finger 180-1. Thus, the multipath combiner 191 receives the signals output from the first to $L^{th}$ fingers, combines the signals with each other through a multipath scheme, and outputs the signals to the de-interleaver 193. The de-interleaver 193 receives the signals output from the multipath combiner 191, de-interleaves the signals through a predetermined de-interleaving method corresponding to the interleaving method used in the transmitter, and outputs the signals to the decoder 195. Upon receiving the signals from the de-interleaver 193, the decoder 195 decodes the signals through a decoding method corresponding to the encoding method used in the transmitter and outputs signals as the final reception data.

The signal processor 184 calculates weight values $\underline{w}_k$ according to a predetermined algorithm in order to minimize a mean square error (hereinafter, simply referred to as "MSE") of a signal transmitted from a desired transmitter. In addition, the reception beam generator 185 creates a reception beam by using the weight values $\underline{w}_k$ calculated by the signal processor 184. The process for creating the reception beam such that the MSE can be minimized is referred to as "spatial processing". Of course, the process for creating a transmission beam such that the MSE can be minimized is also referred to as "spatial processing". Therefore, when the MIMO-AAA scheme is used for the mobile communication system, the time processing and the spatial processing are simultaneously carried out, which referred to as a "spatial-temporal processing".

Meanwhile, as mentioned above, the signal processor 184 calculates weight values $\underline{w}_k$ capable of maximizing a gain of the MIMO-AAA scheme according to a predetermined algorithm by receiving the multipath signals before the multipath signals have been de-spread and after the multipath signals have been de-spread in each finger. In the same manner, the weight values $\underline{w}_k$ capable of maximizing a gain of the MIMO-AAA scheme are calculated in the transmitter according to a predetermined algorithm. The signal processor 184 and the transmission beam generator 105 are operated to achieve a minimum MSE. Recently, studies and research have been actively carried out regarding an algorithm for calculating the weight values in order to minimize the MSE. According to the algorithm for calculating the weight values for minimizing the MSE, an error is reduced on the basis of a reference signal. If the reference signal does not exist, the algorithm may provide a constant modulus (hereinafter, simply referred to as "CM") scheme and a decision-directed (hereinafter, simply referred to as "DD") scheme through a blind manner.

However, the algorithm for minimizing the MSE on the basis of a reference signal is not adaptable if a channel is subject to a fast fading environment. For example, if a channel is subject to a fast fading environment, such as a fast fading channel, or a higher order modulation environment, such as 16 QAM, it is difficult to obtain through the algorithm the MSE having a minimum value required by a system. Even if the minimum MSE can be obtained through the algorithm, the minimum MSE has a relatively large value. If the minimum MSE is determined with a relatively large value, a gain expected when the MIMO-AAA scheme is applied to the mobile communication system may be significantly reduced, so it is not adaptable for a high-speed data communication system. In addition, since both the transmitter and the receiver must calculate the weight values for creating the transmission beam and the reception beam, respectively, a high load may occur when calculating the weight values.

SUMMARY OF THE INVENTION

Accordingly, the present invention has been made to solve at least the above-mentioned problems occurring in the prior art, and an object of the present invention is to provide a system and a method for transmitting/receiving signals in a mobile communication system using a multiple input multiple output adaptive antenna array scheme.

Another object of the present invention is to provide a system and a method for controlling a weight value of a transmitter by using the weight value information of the transmitter in a mobile communication system using a multiple input multiple output adaptive antenna array scheme.

Still another object of the present invention is to provide a system and a method for transmitting/receiving signals in a mobile communication system using a multiple input multiple output adaptive antenna array scheme by using a two-step weight value creation method.

In order to accomplish these objects, according to one aspect of the present invention, there is provided a system for transmitting/receiving signals in a mobile communication system using a multiple input multiple output adaptive antenna array scheme, the system including a de-spreader for creating a de-spread signal by de-spreading a reception signal, a signal processor for calculating a reception weight value based on the de-spread signal for creating a reception beam of a receiver and calculating a transmission weight value based on the calculated reception weight value for creating a transmission beam of a related transmitter, a feedback information generator for creating feedback information including the transmission weight value, and a transmitter for transmitting the feedback information to the receiver.

In order to accomplish these objects, according to another aspect of the present invention, there is provided a system for transmitting/receiving signals in a mobile communication system using a multiple input multiple output adaptive antenna array scheme, the system including a receiver for receiving feedback information transmitted from a related transmitter, a feedback information processor for detecting a transmission weight value from the feedback information to create a transmission beam of the related transmitter, a transmission beam generator for creating the transmission beam corresponding to the detected transmission weight value such that the transmission beam is applied to a signal to be transmitted to a related receiver and a transmitter for transmitting the signal to the related receiver by applying the transmission beam to the signal.

In order to accomplish these objects, according to still another aspect of the present invention, there is provided a mobile communication system using a multiple input multiple output adaptive antenna array scheme, the mobile communication system including a first apparatus including a first transmitter and a first receiver, and a second apparatus including a second transmitter and a second receiver. The first receiver creates a de-spread signal by de-spreading a reception signal, calculates a reception weight value based on the de-spread signal for creating a reception beam of the first receiver and calculates a transmission weight value based on the calculated reception weight value for creating a transmission beam of the second transmitter, thereby creating feedback information including the transmission weight value, the first transmitter transmits the feedback information to the second receiver, the second receiver receives the feedback information, and the second transmitter detects the transmission weight value from the feedback information received in the second receiver, and creates the transmission beam corresponding to the detected transmission weight value to transmit a signal by applying the transmission beam to the signal.

In order to accomplish these objects, according to still another aspect of the present invention, there is provided a method for transmitting/receiving signals in a mobile communication system using a multiple input multiple output adaptive antenna array scheme, the method including the steps of creating by a receiver a de-spread signal by de-spreading a reception signal, calculating by the receiver a reception weight value based on the de-spread signal for creating a reception beam of the receiver and calculating by the receiver a transmission weight value by using the calculated reception weight value for creating a transmission beam of a transmitter of a counter part, creating by the receiver feedback information including the transmission weight value, and transmitting by a transmitter the feedback information to a receiver of a counter part In order to accomplish these objects, according to still another aspect of the present invention, there is provided a method for transmitting/receiving signals in a mobile communication system using a multiple input multiple output adaptive antenna array scheme, the method including the steps of receiving by a receiver feedback information transmitted from a transmitter, detecting by the transmitter a transmission weight value from the feedback information to create a transmission beam of the transmitter, and creating the transmission beam corresponding to the detected transmission weight value and transmitting a signal to the receiver by applying the transmission beam to the signal by means of the transmitter.

In order to accomplish these objects, according to still another aspect of the present invention, there is provided a method for transmitting/receiving signals in a mobile communication system including a first apparatus having a first transmitter and a first receiver and a second apparatus having a second transmitter and a second receiver, the first and second apparatuses using a multiple input multiple output adaptive antenna array scheme, the method including the steps of creating by a first receiver a de-spread signal by de-spreading a reception signal, calculating a reception weight value based on the de-spread signal for creating a reception beam of the first receiver and calculating by the first receiver a transmission weight value based on the calculated reception weight value for creating a transmission beam of a second transmitter, creating by the first transmitter feedback information including the transmission weight value, transmitting the feedback information to the second receiver, receiving by a second receiver the feedback information transmitted from the first transmitter, and detecting by means of the second transmitter the transmission weight value from the feedback information received in the second receiver, creating by means of the second transmitter the transmission beam corresponding to the detected transmission weight value, and transmitting by means of the second transmitter a signal to the first receiver by applying the transmission beam to the signal.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
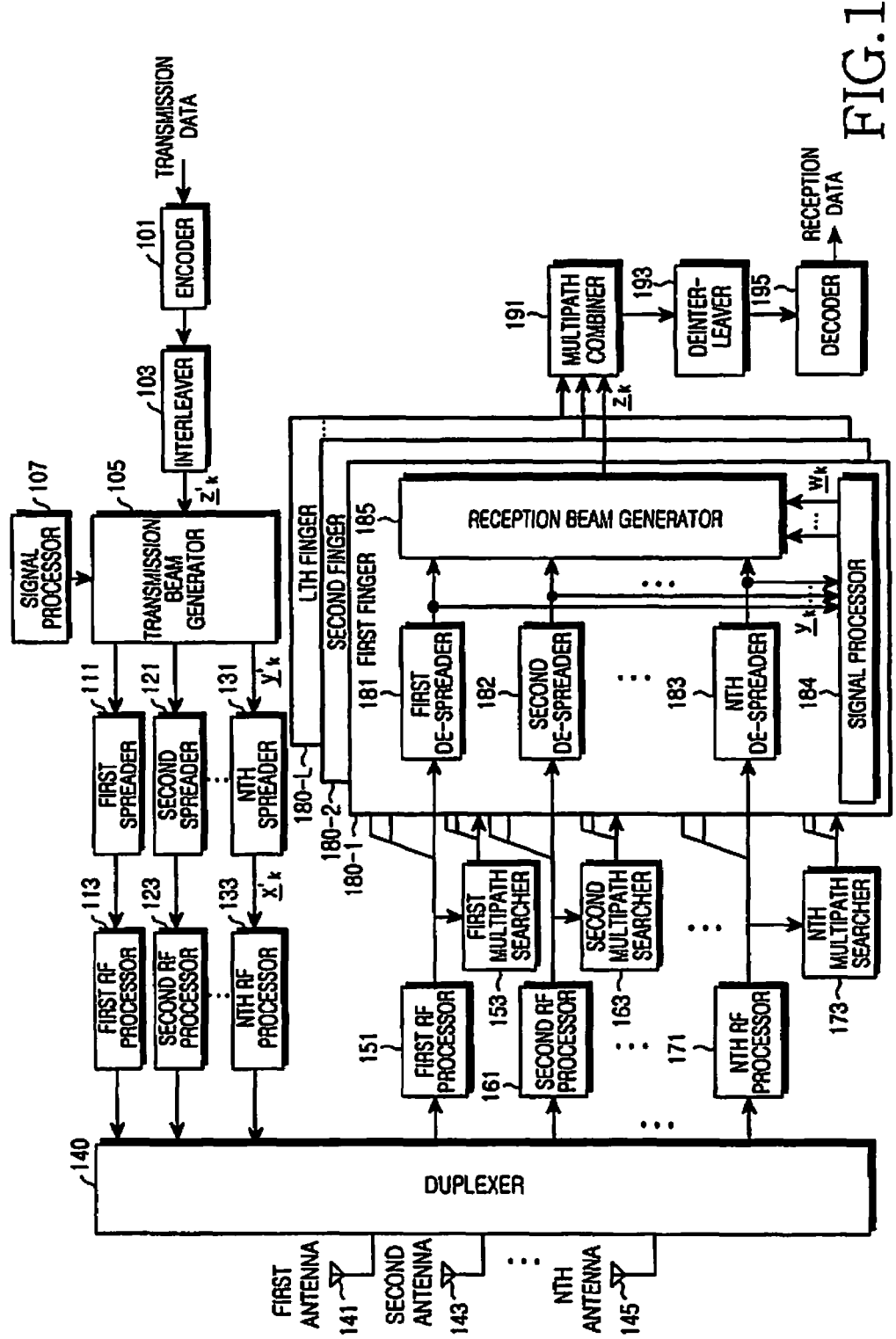
FIG. 1 is a block diagram of a general CDMA mobile communication system.

Hereinafter, preferred embodiments of the present invention will be described with reference to the accompanying drawings. In the following description of the present invention, a detailed description of known functions and configurations incorporated herein will be omitted when it may obscure the subject matter of the present invention.

Prior to explaining the present invention, a description will be made of a signal model received in a receiver of a mobile communication system using a code division multiple access (hereinafter, simply referred to as "CDMA") scheme. The receiver may include a base station receiver or a mobile station receiver capable of receiving a signal. Herein, the base station receiver will be utilized as an example in order to describe a received signal model.

The base station receiver includes a reception antenna array (Rx antenna array) having a plurality of reception antennas. In addition, although the present invention may be adaptable for various mobile communication systems using a frequency division multiple access (hereinafter, simply referred to as "FDMA") scheme, a time division multiple access (hereinafter, simply referred to as "TDMA") scheme, a CDMA scheme, or an orthogonal frequency division multiplexing (hereinafter, simply referred to as "OFDM") scheme, the present invention will be described in relation to a mobile communication system using the CDMA scheme (hereinafter, simply referred to as "CDMA mobile communication system") and a mobile communication system using the OFDM scheme (hereinafter, simply referred to as "OFDM mobile communication system") for convenience of explanation.

Firstly, a signal transmitted from a predetermined mobile station existing in a cell positioned in a service area of a base station, that is, a signal transmitted from a transmitter of an $m^{th}$ mobile station is represented as follows in Equation 2.

$$s_m(t) = \sqrt{p_m} b_m(t) c_m(t) \quad (2)$$

In the above Equation 2, $s_m(t)$ represents a transmission signal of the $m^{th}$ mobile station, $p_m$ represents the transmission power of the $m^{th}$ mobile station, $b_m(t)$ represents a user information bit sequence of the $m^{th}$ mobile station, and $c_m(t)$ represents a user spreading code sequence of the $m^{th}$ mobile station having a chip period of $T_c$.

The transmission signal transmitted from the transmitter of the mobile station is received in the receiver of the base station through a multipath vector channel. The channel parameters of the multipath vector channel may vary with a relatively low speed in relation to a bit period $T_b$. It is assumed that the channel parameters are constantly maintained during the predetermined bit periods. Thus, a complex baseband signal received in the receiver of the base station through a first multipath of the $m^{th}$ mobile station is represented as follows in Equation 3. It is noted that the received signal represented in Equation 3 is a radio frequency (hereinafter, simply referred to as "RF") signal, which has been received in the receiver of the base station and down-converted into a baseband signal.

$$\underline{x}_{m1}(t) = \alpha_{m1} e^{j\phi_{m1}} b_m(t - \tau_{m1}) c_m(t - \tau_{m1}) \underline{a}_{m1} \quad (3)$$

In above Equation 3, $\underline{x}_{m1}(t)$ represents a set of complex baseband signals received in the receiver through the first multipath of the $m^{th}$ mobile station, $\alpha_{m1}$ represents an attenuation degree of the fading applied to the first multipath of the $m^{th}$ mobile station, $\phi_{m1}$ represents a phase transition applied to the first multipath of the $m^{th}$ mobile station, $\tau_{m1}$ represents a time delay applied to the first multipath of the $m^{th}$ mobile station, and $\underline{a}_{m1}$ represents a set of an array responses (AR) applied to the first multipath of the $m^{th}$ mobile station. Since the receiver of the base station includes an N-number of reception antennas, the signal transmitted from the $m^{th}$ mobile station may be received in the receiver through the N-number of reception antennas so that an N-number of signals are received in the receiver through the first multipath of the $m^{th}$ mobile station. Thus, an N-number of complex baseband signals received in the receiver through the first multipath of the $m^{th}$ mobile station may form a set of the complex baseband signals. For the purpose of convenience of explanation, the term "set" will be omitted below. It is noted that parameters having an under-score mark represent a set of specific elements.

If a currently used linear antenna array is utilized, the array responses $\underline{a}_{m1}$ may be represented as follows in Equation 4.

$$\underline{a}_{ml} = \begin{bmatrix} 1 & e^{j2\pi \frac{d}{\lambda} \sin\theta_{ml}} & \cdots & e^{j2\pi \frac{d}{\lambda}(N-1)\sin\theta_{ml}} \end{bmatrix}^T \quad (4)$$

In the above Equation 4, d represents the distance between the reception antennas, $\lambda$ represents a wavelength in a usable frequency band, N represents the number of reception antennas, and $\theta_{m1}$ represents a direction of arrival (DOA) applied to the first multipath of the $m^{th}$ mobile station.

In addition, on the assumption that the number of the mobile stations existing in a cell positioned in a service area of a base station is "M" and an L-number of multipaths may exist corresponding to an M-number of mobile stations, the signal received in the base station may include not only signals transmitted from each of the mobile stations, but also additive white noise. The signal is represented in following Equation 5.

$$\underline{x}(t) = \sum_{m=1}^{M} \sum_{l=1}^{L} \underline{x}_{ml}(t) + \underline{n}(t) \quad (5)$$

In above Equation 5, $\underline{n}(t)$ represents a set of additive white noise added to the transmission signals transmitted from the M-number of mobile stations.

Among those reception signals satisfying Equation 5, the desired signals required by the base station are defined as $\underline{x}_{11}$. Herein, $\underline{x}_{11}$ may represent the signals transmitted from a first mobile station through the first multipath. Since the desired signals that are required by the base station are defined as $\underline{x}_{11}$, all of the signals except for $\underline{x}_{11}$ are regarded as interference signals and noise. Thus, Equation 5 can be replaced with Equation 6.

$$\underline{x}(t) = \alpha_{11} e^{j\phi_{11}} b_1(t-\tau_{11}) c_1(t-\tau_{11}) \underline{a}_{11} + \underline{i}(t) + \underline{n}(t) \quad (6)$$

In the above Equation 6, $\underline{i}(t)$ represents the interference signals. The interference signals can be represented as follows in Equation 7.

$$i(t) = \sum_{l=2}^{L} x_{1l}(t) + \sum_{m=2}^{M}\sum_{l=1}^{L} x_{ml}(t) \quad (7)$$

In the above Equation 7 representing the interference signals, although the first term of the equation is the desired transmission signals of the mobile station required by the base station, the first term of the equation represents the undesired inter-path interference signals transmitted through the multipaths. In addition, the second term of Equation 7 represents the multiple access interference signals caused by other mobile stations.

In addition, $\underline{x}(t)$ is de-spread by using a de-spread code $c_1(t-\tau_{11})$, which is determined in a finger, that is, in a first finger (l=1) existing in a corresponding multipath of a corresponding channel card of the base station receiver, that is, a channel card (m=1) assigned to the first mobile station. After the de-spreading of the signals $\underline{x}(t)$ has been carried out, signals $\underline{y}(t)$ are represented. Equation 8 shows the signals $\underline{y}(t)$. The de-spread code $c_1(t-\tau_{11})$ is identical to the spread code $c_1(t-\tau_{11})$ used in the transmitter of the mobile station for transmitting the signal. In addition, the base station has a plurality of receivers having the structure described with reference to FIG. 1. Herein, each of the receivers is referred to as a "channel card" and one channel card is assigned to one mobile station. In addition, as was already described with reference to FIG. 1, the channel card has a plurality of fingers corresponding to the number of multipaths and each finger is mapped with each multipath signal on a one-to-one basis.

$$\underline{y}(k) = \int_{(k-1)T_b+\tau_{11}}^{kT_b+\tau_{11}} \underline{x}(t) c^*_1(t-\tau_{11}) dt \quad (8)$$

In the above Equation 8, k represents a $k^{th}$ sampling point.

If signals $\underline{y}(t)$ are created by de-spreading signals $\underline{x}(t)$ using the de-spread code $c_1(t-\tau_{11})$, the power of desired signals required by the receiver of the base station may be amplified by a process gain G corresponding to the characteristics of the de-spreader. It is noted that power of the desired signals required by the receiver of the base station can be amplified by a process gain G, but the power of any undesired signals can be constantly maintained. Accordingly, it is possible to obtain a correlation matrix between the reception signals $\underline{x}(t)$ and the de-spread reception signals $\underline{y}(t)$. In order to obtain the correlation matrix between the reception signals $\underline{x}(t)$ and the de-spread reception signals $\underline{y}(t)$, a sampling operation for the reception signals $\underline{x}(t)$ is carried out at the $k^{th}$ sampling point, at which time a sampling operation for the de-spread reception signals $\underline{y}(t)$ is also carried out. Equation 9 shows sampling signals of reception signals $\underline{x}(t)$ at the $k^{th}$ sampling point.

$$\underline{x}(k) = \alpha_{11} e^{j\phi_{11}} b_{1k} c_{1k} \underline{a}_{11} + \underline{i}_k + \underline{n}_k \quad (9)$$

The correlation matrix between the reception signals $\underline{x}(t)$ and the de-spread reception signals $\underline{y}(t)$ can be achieved on the assumption that the sampling signals as shown in Equation 9 are obtained by sampling the reception signals $\underline{x}(t)$ at the $k^{th}$ sampling point, a point identical to the sampling point of the de-spread reception signals $\underline{y}(t)$ and the reception signals $\underline{x}(t)$ and the reception signals $\underline{y}(t)$ maintain the stationary state.

A two-step least mean square (hereinafter, simply referred to as "LMS") method will be described.

The complex reception signals received through the N-number of the reception antennas at a predetermined point, that is, a set of complex reception signals $x_1$ to $x_N$, which are received through the first to $N^{th}$ reception antennas, and are not yet de-spread, is defined as $\underline{x}=[x_1 x_2 \ldots x_N]^T$. T is an operator representing a transpose operation. In addition, a set of complex reception signals $x_1$ to $x_N$, which are received through the first to $N^{th}$ reception antennas and are de-spread, is defined as $\underline{y}=[y_1 y_2 \ldots y_N]^T$. The de-spread reception signals $\underline{y}$ may consist of the desired signal components $\underline{s}$ required by the receiver of the base station and any undesired signal components $\underline{u}$. Equation 10 represents the de-spread reception signals $\underline{y}$.

$$\underline{y} = \underline{s} + \underline{u} \quad (10)$$

In addition, a set of complex weight values that is applied to the complex reception signals $x_1$ to $x_N$ that are received through the N-number of the reception antennas, that is, a set of the complex weight values $w_1$ to $W_N$, which will be multiplied with the complex reception signals $x_1$ to $x_N$ received through the N-number of the reception antennas, respectively, is defined as $$\underline{w}=[w_1 w_2 \ldots w_N]^T.$$

Thus, the output signals $\underline{z}$ of a channel card of a predetermined user, that is, the output signals $\underline{z}$ output from the fingers in a channel card assigned to a specific mobile station, may be obtained by combining the weight values $\underline{w}$ with the de-spread reception signals $\underline{y}$. Equation 11 represents the output signals $\underline{z}$.

$$z = \underline{w}^H \underline{y} = \sum_{i=1}^{N} w_i^* y_i \quad (11)$$

In the above Equation 11, i represents the number of the reception antennas.

The output signals $\underline{z}$ can be divided into the desired signal components $\underline{w}^H \underline{s}$, which are required by the receiver of the base station and any undesired signal components $\underline{w}^H \underline{u}$ according to Equations 10 and 11. The LMS method is provided for minimizing an error of a reference signal and a reception signal, that is, the LMS method may minimize a cost function J(w) as shown in Equation 12.

$$J(\underline{w}) = (e_k)^2 \quad (12)$$
$$e_k = d_k - z_k$$

In the above Equation 12, J is a cost function. It is necessary to find a value of $\underline{w}$ capable of minimizing a value of the cost function J. In addition, $e_k$ represents a difference between a received signal and a desired signal, that is, $e_k$ represents an error, and $d_k$ represents the desired signal. According to a beam creation algorithm using a non-blind method, a pilot signal is used as the desired $d_k$. However, the present invention suggests a beam creation algorithm using a blind method, so the beam creation algorithm using the non-blind method will not be further described below.

In Equation 12, the cost function J is provided in the form of a quadratic convex function. Thus, in order to minimize a value of the cost function J, it is necessary to differentiate the cost function J such that a differential value of the cost function J becomes zero. The differential value of the cost function J is represented in Equation 13.

$$\nabla J = -2e^*_k \underline{v}_k \tag{13}$$

It is difficult to obtain an optimal weight value $\underline{w}^{opt}$ at a time under an actual channel environment. Since the de-spread reception signals $\underline{y}_k$ are input in every predetermined period of time, a reflexive equation, such as Equation 14 shown below, must be used in order to adaptively or reflexively obtain the optimal weight value $\underline{w}^{opt}$.

$$\underline{w}_{R,k+1} = \underline{w}_{R,k} + \mu \underline{v}_{R,k} \tag{14}$$

In the above Equation 14, k represents a $k^{th}$ point, $\underline{w}_{R,k}$ represents a weight value received at the $k^{th}$ point, $\mu$ is a constant gain value, and $\underline{v}_{R,k}$ represents a trace vector at the $k^{th}$ point. The trace vector $\underline{v}_{R,k}$ of the $k^{th}$ point allows the cost function J to have a differential value converged into a minimum value, that is, into zero. For convenience of explanation, a weight value used for creating a transmission beam of a transmitter is referred to as a "transmission weight value", and a weight value used for creating a reception beam of a receiver is referred to as "reception weight value".

In short, Equation 14 represents an updating process for the weight value. When the weight value $\underline{w}_{R,k}$ to be used in the present time is given, a weight value obtain through a forward transition or a rearward transition of the weight value $\underline{w}_{R,k}$ in a direction of the trace vector $\underline{v}_{R,k}$ by a constant gain value is updated as a next weight value $\underline{w}_{R,k+1}$ to be used in the next time.

In addition, Equation 14 can be replaced with Equation 15 in view of a mean square.

$$\underline{w}_{R,k+1} = \underline{w}_{R,k} - \mu \underline{v}_k e^*_k \tag{15}$$

The present invention suggests a weight value feed back apparatus and a method thereof for creating a transmission beam by using the MIMO-AAA scheme. In addition, the present invention suggests an apparatus and a method capable of creating the weight values for the transmission beam and the reception beam through a two-step weight value creation method.

Herein, a transmission weight value $\underline{w}_{T,k}$ is represented as follows in Equation 16.

$$\underline{w}_{T,k+1} = \underline{w}_{T,k} - \mu \underline{z}_k e^*_k \underline{w}^*_{T,k} \tag{16}$$

As shown in Equation 16, the weight value of the transmitter is calculated in the receiver by using a restored signal. The receiver must transmit the calculated weight value to the transmitter in order to be used by the transmitter.

The receiver calculates the weight value of the transmitter by using a restored signal $\underline{z}_k$ which can be calculated based on the de-spread reception signal and the reception weight value. Thus, according to the preferred embodiment of the present invention, the weight value of the transmitter calculated by the receiver is transmitted into the transmitter.

A procedure for calculating the reception weight value will be described with reference to Equations 17 to 28. For the purpose of convenience of explanation, the spread and the de-spread operations will be omitted in the explanation. In addition, the parameters used in Equations 17 to 28 are identical to the parameters described with reference to FIG. 1. A signal provided before a beam is generated from the transmitter and is defined as "$z'_k$" in FIG. 2. If a channel is defined as a matrix H, $x_k$ will be represented as follows in Equation 17.

$$\underline{z}_k = \underline{H} \underline{w}_T z'_k + \underline{n}_k \tag{17}$$

Herein, a signal received by means of a reception beam generator is represented as follows in Equation 18.

$$\underline{z}_k = \underline{w}_R^H \underline{H} \underline{w}_T z'_k \tag{18}$$

In the above Equation 18, a noise value is omitted for convenience of calculation. In this case, an error signal occurring in a $k^{th}$ snap is represented as follows in Equation 19.

$$e_k = d_k - z_k \tag{19}$$
$$= \underline{w}_{R,k}^H \underline{H} \, \underline{w}_{T,k} z_k$$

In order to obtain a transmission antenna weight value, the above Equation 19 is differentiated about $w_T$, to obtain an error differential value as represented in Equation 20.

$$\frac{d\varepsilon_k^2}{d\underline{w}_{T,k}} = -2\varepsilon_k \frac{d\varepsilon_k}{d\underline{w}_{T,k}} \tag{20}$$

In the above Equation 20, an error value $\epsilon_k$ is represented as follows in Equation 21.

$$\varepsilon_k = d_k - \underline{w}_{R,k}^H \underline{H} \, \underline{w}_{T,k} z'(k) \tag{21}$$
$$= d_k - (z_k'^* H^H \underline{w}_{R,k})^H \underline{w}_{T,k}$$

In addition, a transmission beam creation vector can be represented as follows in Equation 22 by using Equation 21.

$$\underline{w}_{T,k+1} = \underline{w}_{T,k} - \mu \epsilon_k z'_k \underline{H}^T \underline{w}^*_{R,k} \tag{22}$$

In addition, Equations 23 and 24 can be obtained through the rearranging of the reception signals of the receiver by multiplying both sides of Equation 22 with $w_T$.

$$\underline{x}_k \underline{w}^H_{T,k} = \underline{H} z'_k \underline{w}_{T,k} \underline{w}^H_{T,k} \tag{23}$$

$$\underline{H} z'_k = (\underline{x}_k \underline{w}^H_{T,k})(\underline{w}_{T,k} \underline{w}^H_{T,k})^{-1} \tag{24}$$
$$= (\underline{x}_k \underline{w}^H_{T,k})(\underline{w}^H_{T,k})^{-1}(\underline{w}_{T,k})^{-1}$$
$$= \underline{x}_k \underline{w}^H_{T,k} \underline{w}_{T,k} \underline{w}^H_{T,k}$$
$$= \underline{x}_k \underline{w}^H_{T,k}$$

Equation 22 can be replaced with Equation 25 by rearranging Equation 22 using Equation 24.

$$z'_k H^T \underline{w}^*_{R,k} = \underline{w}^*_{T,k} \underline{x}^T_k \underline{w}^*_{R,k} \tag{25}$$
$$= \left(\underline{w}^*_{R,k} T \underline{x}_k \underline{w}^*_{T,k} T\right)^T$$
$$= (\underline{w}^H_{R,k} \underline{x}_k \underline{w}^H_{T,k})^T$$
$$= z_k \underline{w}^*_{T,k}$$

Finally, the transmission beam creation vector is represented as follows in Equation 26.

$$\underline{w}_{T,k+1} = \underline{w}_{T,k} - 2\mu \epsilon_k z_k \underline{w}^*_{T,k} \tag{26}$$

As described above, an optimum weight value $\underline{w}^{opt}$ is a very important factor for creating the reception beam. The present invention minimizes an error of a reference signal and a reception signal by using the two-step LMS method. According to the present invention, the weight values $w_{R,k}$ and $w_{T,k}$ capable of minimizing the value of the cost function described with reference to Equation 12 are obtained to obtain the optical weight value $\underline{w}^{opt}$. The present invention suggests a new method of detecting a desired signal d(k) as shown in Equation 12, and suggests a method for feeding back the transmission weight value $w_{T,k}$ to the transmitter after calculating the transmission weight value $w_{T,k}$ using the reception weight value calculated by the receiver.

According to the present invention, the desired signal d(k) is detected through a blind method. It is necessary to adaptively converge the reception signal by using a specific presumed value. For this reason, the desired signal d(k) is obtained through the two-step LMS method. According to the present invention, the desired signal d(k) may be obtained through a signal convergence step and a signal stabilization step.

The first step of the two-step LMS method, that is, the signal convergence step will be described.

Firstly, a constant modules (hereinafter, simply refereed to as "CM") scheme, which is used for adaptively converging the reception signal, will be described.

The CM scheme is suggested by Godard, and is generally used for a blind equalizer and a beam creation algorithm. If the CM scheme suggested by Godard is used, the cost function J is represented as follows in Equation 27.

$$J_{Godard} = E[(|z_n|^p - R_p)^2] \tag{27}$$

In above Equation 27, p is a predetermined positive integer, and $R_p$ is a Godard modulus. Herein, the Godard modulus $R_p$ is represented as follows in Equation 28.

$$R_p = \frac{E[|z_n|^{2p}]}{E[|z_n|^p]} \tag{28}$$

Recently, discussion has been actively carried out regarding an OFDM mobile communication system. In general, the OFDM mobile communication system uses a relatively higher order modulation more than a quadrature phase shift keying modulation, so the cost function J is divided into a real number section and an imaginary number section when calculating the cost function J as represented in Equation 29. This is done because the transmission signal and the reception signal have real number components and imaginary number components due to the higher order modulation.

$$J = J_R + J_I \tag{29}$$

$$J_R = E[(z_{n,R}^2 - R_{2,R})^2], J_I = E[(z_{n,I}^2 - R_{2,I})^2]$$

$$R_{2,R} = \frac{E[z_{n,R}^4]}{E[z_{n,R}^2]}, R_{2,I} = \frac{E[z_{n,I}^4]}{E[z_{n,I}^2]}$$

It is assumed that the present invention uses the two-step LMS method and p is equal to 2. The desired signal d(k) is determined as $d(k)=R_{2,R}+jR_{2,I}$. At an initial point (herein, k=0), a value of the cost function J is assumed to be zero (J=0).

Based on the above assumption, the CM scheme according to the present invention will be described below with reference to FIG. 12.

Figure 12:
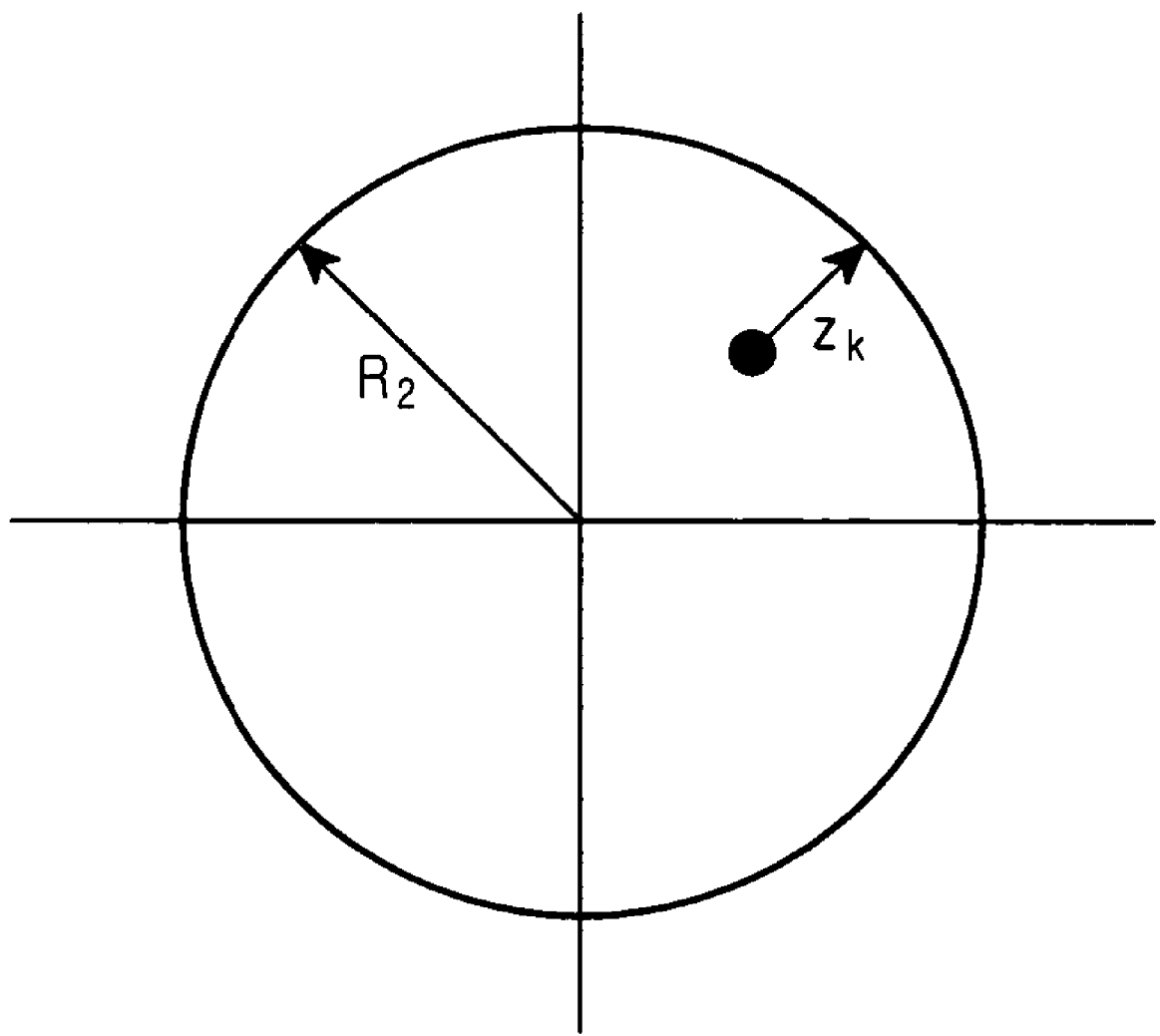
FIG. 12 is a graph of a CM scheme used in a mobile communication system.

FIG. 12 is a graph of the CM scheme used in a mobile communication system when p=2, $d(k)=R_{2,R}+jR_{2,I}$, and J=0 (herein k=0).

As mentioned above, FIG. 12 shows the CM scheme used when the value of the cost function J becomes 0 at a point where k=0, p=2, and $d(k)=R_{2,R}+jR_{2,I}$. That is, when the value of $R_2$ is determined according to Equation 29, a circle is formed on a coordinate surface. When drawing an extension line from a center point of the circle, the extension line meets the circumference line of the circle. A received signal may be determined based on a point at which the extension line meets the circumference line of the circle. As shown in FIG. 12, the signal $z_k$ restored in the receiver is projected onto the circle.

The above procedure is the signal convergence step. Hereinafter, the second step of the two-step LMS method for obtaining the desired signal d(k), that is, the signal stabilization step, will be described.

If the MSE has been converged into a predetermined value through the above convergence step, the signal stabilization step is carried out to perform an operation as shown in Equation 30. A step transition process from the signal convergence step to the signal stabilization step will be described later, so a detailed description thereof will now be omitted.

$$d_R(k)=Pr[Re(z(k))]$$

$$d_I(k)=Pr[Im(z(k))] \tag{30}$$

In the same manner as the signal convergence step, the real number section and the imaginary number section must be individually calculated in the signal stabilization step. In the above Equation 30, Pr signifies that the signal is transmitted substantially identical to the desired signal d(k) through a decision-directed (hereinafter, simply referred to as "DD") scheme. According to the DD scheme, the desired signal d(k) is projected with an approximate coordinate value in relation to a coordinate value of the received signal. Hereinafter, the DD scheme will be described with reference to FIG. 7.

Figure 7:
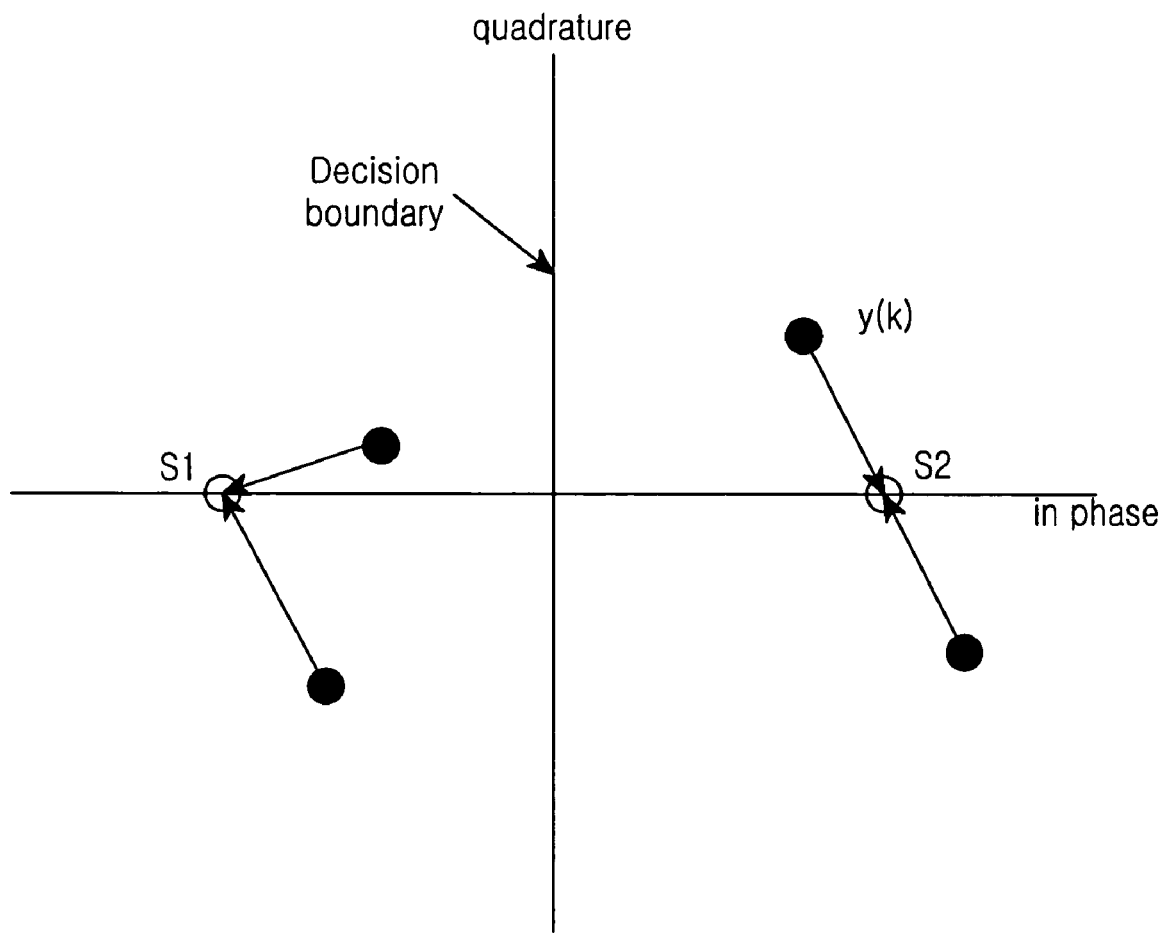
FIG. 7 is a graph of a DD scheme when a BPSK scheme is used in a mobile communication system.

FIG. 7 is a graph of the DD scheme when a BPSK scheme is used in the mobile communication system.

Referring to FIG. 7, since the mobile communication system uses the BPSK (binary phase shift keying) scheme, if the received signal has a coordinate value of (1.2,−0.2) on an I-Q domain, the desired signal d(k) is projected with an approximate coordinate value of 1 after measuring a distance in relation to +1 and −1.

The structures of a transmitter and a receiver of a base station of a CDMA mobile communication system for performing the functions according to one embodiment of the present invention will be described with reference to FIG. 2.

Figure 2:
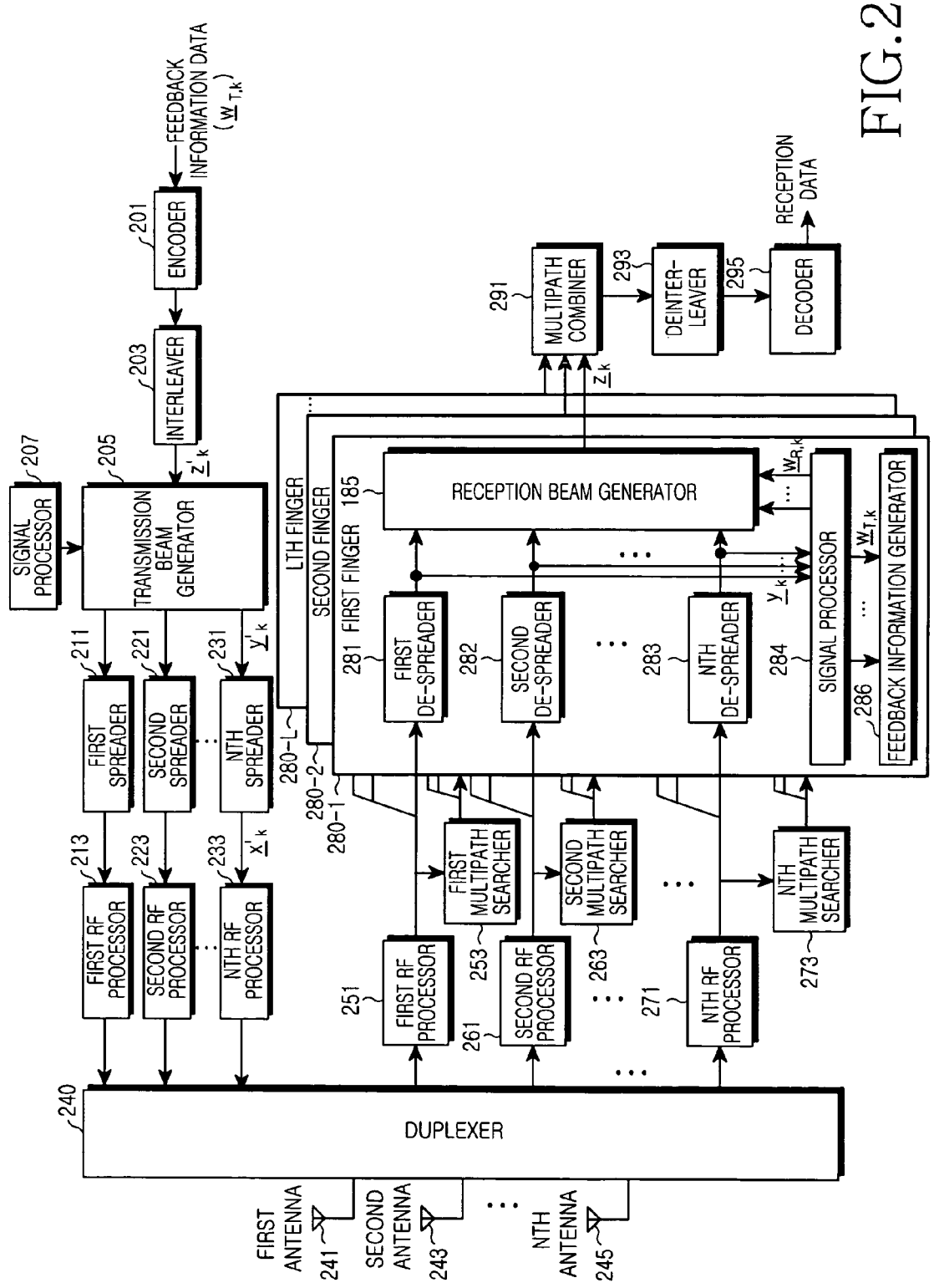
FIG. 2 is a block diagram of a transmitter and a receiver of a base station of a CDMA mobile communication system performing functions according to one embodiment of the present invention.

FIG. 2 is a block diagram of the transmitter and the receiver of the base station of the CDMA mobile communication system for performing the functions according to one embodiment of the present invention;

Structures of the transmitter and the receiver of the base station for performing the functions shown in FIG. 2 according to one embodiment of the present invention are identical to structures of the transmitter and the receiver of the base station shown in FIG. 1, except that the present invention includes a feedback information generator 286, which is newly added to the present invention, a weight value determining procedure of a signal processor 284, and a feedback operation for transmitting the weight value determined by the signal processor 284 to the transmitter of the mobile station corresponding to the receiver of the base station.

Prior to the explaining of FIG. 2, it is noted that the following description is made on the assumption that the CDMA mobile communication system adopts the MIMO-AAA scheme. The transmitter and the receiver must have a plurality of transmission antennas and a plurality of reception antennas, respectively. However, according to FIG. 2, the transmitter and the receiver do not have separate transmission antennas and reception antennas, but the same antennas are used for both the transmitter and the receiver through a time division scheme by using a duplexer. In addition, according to FIG. 2, an N-number of antennas is used.

Firstly, the transmitter of the base station of the CDMA mobile communication system will be described.

Referring to FIG. 2, the transmitter of the base station includes an encoder 201, an interleaver 203, a transmission beam generator 205, a signal processor 207, a plurality of spreaders including a first to $N^{th}$ spreaders 211, 221, . . . , and 231, and an N-number of radio frequency (hereinafter, simply referred to as "RF") processors including a first to $N^{th}$ RF processors 213, 223, . . . , and 233. In addition, a duplexer 240 is commonly used for both the transmitter and the receiver, and an N-number of antennas including a first to $N^{th}$ antennas 241, 243, . . . , and 245 are also commonly used for both the transmitter and the receiver.

If data to be transmitted is created, the data is input into the encoder 201. The encoder 201 encodes the data through a predetermined encoding method and outputs a signal to the interleaver 203. Herein, the data to be transmitted is feedback information data including the transmission weight value $\underline{w}_{T,k}$ created from the signal processor 284 of the receiver of the base station. Since the transmission weight value $\underline{w}_{T,k}$ is further described later, a detailed description thereof will now be omitted. In addition, the encoding method can include a turbo encoding method or a convolutional encoding method. Upon receiving the signal from the encoder 201, the interleaver 203 interleaves the signal through a predetermined interleaving method in order to prevent a burst error and outputs the signal to the transmission beam generator 205. Herein, the signal output from the interleaver 203 is defined as "$z'_k$". Then, the signal processor 207 calculates a weight value based on the signal $z'_k$ output from the interleaver 203 and outputs the signal to the transmission beam generator 205. Then, the transmission beam generator 205 generates a transmission beam by taking into consideration the signal $z'_k$ output from the interleaver 203 and the weight value calculated in the signal processor 207 and outputs the transmission beam to the first to $N^{th}$ spreaders 211, 221, . . . , and 231, respectively. That is, the transmission beam generator 205 receives the signal output from the interleaver 203, creates the transmission beam, and transmits the transmission beam to each of the first to $N^{th}$ spreaders 211, 221, . . . , and 231 in such a manner that the transmission beam can be transmitted through each of the first to $N^{th}$ antennas 241, 243, . . . , and 245.

A procedure of creating the transmission beam does not directly relate to the present invention, so a detailed description thereof will be omitted. Of course, if the receiver of the base station has previously received the feedback information data from the transmitter of the mobile station, the transmission beam generator 205 may create the transmission beam by using the transmission weight value $\underline{w}_{T,k}$ contained in the feedback information data. A process of creating the transmission beam by receiving the transmission weight value $\underline{w}_{T,k}$ will be described later with reference to FIG. 3. A set of signals output from the transmission beam generator 205 is represented as "$\underline{y}_k$'" That is, $\underline{y}_k$' is a set of signals generated from the transmission beam generator 205 and mapped to a $k^{th}$ antenna.

The first spreader 211 receives a signal $\underline{y}_1$' output from the transmission beam generator 205 and spreads the signal $\underline{y}_1$' by using a predetermined spreading code. After that, the first spreader 211 outputs the signal $\underline{y}_1$' to the first RF processor 213. Upon receiving the signal from the first spreader 211, the first RF processor 213 performs an RF process with respect to the signal and outputs the signal to the duplexer 240. Herein, each of the RF processors includes an amplifier, a frequency converter, a filter, and an analog to digital converter so as to process RF signals. In addition, the second spreader 221 receives a signal $\underline{y}_2$' output from the transmission beam generator 205 and spreads the signal $\underline{y}_2$' by using a predetermined spreading code. After that, the second spreader 221 outputs the signal $\underline{y}_2$' to the second RF processor 223. Upon receiving the signal from the second spreader 211, the second RF processor 223 performs an RF process with respect to the signal and outputs the signal to the duplexer 240. In the same manner, the $N^{th}$ spreader 231 receives a signal $\underline{y}_N$' output from the transmission beam generator 205 and spreads the signal $\underline{y}_N$' by using a predetermined spreading code. After that, the $N^{th}$ spreader 231 outputs the signal $\underline{y}_N$' to the $N^{th}$ RF processor 233. Upon receiving the signal from the $N^{th}$ spreader 231, the $N^{th}$ RF processor 233 performs an RF process with respect to the signal and outputs the signal to the duplexer 240. The duplexer 240 controls the signal transmission/reception operations by scheduling a transmission point and a receiving point of the signal under the control of a controller (not shown). In addition, the first to $N^{th}$ antennas 241, 243, . . . , and 245 can be operated as transmission antennas (Tx. ANT) or reception antennas (Rx. ANT) according to the signal transmission/reception operations of the duplexer 240.

The receiver of the CDMA mobile communication system will be described.

The receiver includes an N-number of RF processors including a first to $N^{th}$ RF processors 251, 261, . . . , and 271, an N-number of multipath searchers including a first to $N^{th}$ multipath searchers 253, 263, . . . , 273 corresponding to the RF processors, an L-number of fingers including a first to $L^{th}$ fingers 280-1, 280-2, . . . , 280-L for processing signals regarding an L-number of multipaths, which are searched by the multipath searchers, a multipath combiner 291 for combining multipath signals output from the L-number of fingers, a de-interleaver 293, and a decoder 295.

Firstly, signals transmitted from a plurality of transmitters are received in the N-number of antennas over a multipath fading radio channel. The duplexer 240 outputs the signal received through the first antenna 241 to the first RF processor 251. Upon receiving the signal from the duplexer 240, the first RF processor 251 performs an RF process with respect to the signal so as to convert the signal into a baseband digital signal. Then, the first RF processor 251 sends the baseband digital signal to the first multipath searcher 253. Upon receiving the baseband digital signal from the first RF processor 251, the first multipath searcher 253 divides the baseband digital signal into an L-number of multipath components and outputs the multipath components to the first to $L^{th}$ fingers 280-1, 280-2, . . . , 280-L, respectively. Herein, each of the first to $L^{th}$ fingers 280-1, 280-2, . . . , 280-L is mapped to each of the L-number of multipaths in a one to one correspondence so as to process the multipath components. Since the L-number of multipaths must be considered in relation to each signal received through the N-number of reception antennas, the signal process must be carried out with respect to an N×L number of signals. Among the N×L number of signals, the signals having the same path are output to the same finger.

In addition, the duplexer 240 outputs the signal received through the second antenna 243 to the second RF processor 261. Upon receiving the signal from the duplexer 240, the second RF processor 261 performs an RF process with respect to the signal so as to convert the signal into a baseband digital signal. Then, the second RF processor 261 sends the baseband digital signal to the second multipath searcher 263. Upon receiving the baseband digital signal from the second RF processor 261, the second multipath searcher 263 divides the baseband digital signal into an L-number of multipath components and outputs the multipath components to the first to $L^{th}$ fingers 280-1, 280-2, . . . , 280-L, respectively.

In the same manner, the duplexer 240 outputs the signal received through the $N^{th}$ antenna 245 to the $N^{th}$ RF processor 271. Upon receiving the signal from the duplexer 240, the $N^{th}$ RF processor 271 processes RF of the signal so as to convert the signal into a baseband digital signal. Then, the $N^{th}$ RF processor 271 sends the baseband digital signal to the $N^{th}$ multipath searcher 273. Upon receiving the baseband digital signal from the $N^{th}$ RF processor 271, the $N^{th}$ multipath searcher 273 divides the baseband digital signal into an L-number of multipath components and outputs the multipath components to the first to $L^{th}$ fingers 280-1, 280-2, . . . , 280-L, respectively.

In this manner, among signals received through the N-number of antennas, the same multipath signals of the L-number of multipath signals are inputted into the same finger. For instance, first multipath signals of the first to $N^{th}$ antennas 241 to 245 are input into the first finger 280-1, and $L^{th}$ multipath signals of the first to $N^{th}$ antennas 241 to 245 are input into the $L^{th}$ finger 280-L. In the meantime, the first to $L^{th}$ fingers 280-1 to 280-L have the same structure and operation with each other even though different signals are inputted/outputted to/from the first to $L^{th}$ fingers 280-1 to 280-L. Thus, only the structure and operation of the first finger 280-1 will be described below as an example.

The first finger 280-1 includes an N-number of de-spreaders including a first to $N^{th}$ de-spreaders 281, 282, . . . , and 283 corresponding to the N-number of multipath searchers, the signal processor 284 receiving the signals output from the first to $N^{th}$ de-spreaders 281 to 283 in order to calculate the reception weight values $\underline{w}_{R,k}$ for creating the reception beam and the transmission weight values $\underline{w}_{T,k}$ of the transmitter of the mobile station corresponding to the receiver of the base station, a reception beam generator 285 for creating the reception beam based on the reception weight values $\underline{w}_{R,k}$ calculated by the signal processor 284, and a feedback information generator 286 for creating feedback information including the transmission weight values $\underline{w}_{T,k}$ calculated by the signal processor 284.

Firstly, the first multipath signal output from the first multipath searcher 253 is input into the first de-spreader 281. Upon receiving the first multipath signal, the first de-spreader 281 de-spreads the first multipath signal by using a predetermined de-spreading code and outputs the first multipath signal to the signal processor 284 and the reception beam generator 285. In addition, the first multipath signal output from the second multipath searcher 263 is input into the second de-spreader 282. Upon receiving the first multipath signal, the second de-spreader 282 de-spreads the first multipath signal by using a predetermined de-spreading code and outputs the first multipath signal to the signal processor 284 and the reception beam generator 285. In the same manner, the first multipath signal output from the $N^{th}$ multipath searcher 273 is input into the $N^{th}$ de-spreader 283. Upon receiving the first multipath signal, the $N^{th}$ de-spreader 283 de-spreads the first multipath signal by using a predetermined de-spreading code and outputs the first multipath signal to the signal processor 284 and the reception beam generator 285.

The signal processor 284 receives the signals output from the first to $N^{th}$ de-spreaders 281 to 283 and calculates the reception weight values $\underline{w}_{R,k}$ for creating the reception beam. Herein, a set of the first multipath signals output from the first to $N^{th}$ multipath searchers 253 to 273 is defined as "$\underline{x}_k$". That is, $\underline{x}_k$ represents a set of the first multipath signals received at a $k^{th}$ point through the first to $N^{th}$ antennas 241 to 245. All of the first multipath signals forming the first multipath signal set $\underline{x}_k$ are vector signals. In addition, $\underline{w}_{R,k}$ represents a set of the reception weight values to be applied to each of the first multipath signals received at the $k^{th}$ point through the first to $N^{th}$ antennas 241 to 245. All of the weight values forming the reception weight value set $\underline{w}_{R,k}$ are vector signals.

In addition, a set of de-spread signals of the first multipath signals forming the first multipath signal set $\underline{x}_k$ is defined as "$\underline{y}_k$". Herein, $\underline{y}_k$ represents a set of de-spread signals of the first multipath signals received at a $k^{th}$ point through the first to $N^{th}$ antennas 241 to 25. All of the de-spread signals forming the de-spread signal set $\underline{y}_k$ are vector signals. For the purpose of convenience of explanation, the term "set" will be omitted below. It is noted that the parameters having the under-score marks represent a set of specific elements. In addition, since the first to $N^{th}$ de-spreaders 281 to 283 de-spread the first multipath signals $\underline{x}_k$ by using the predetermined de-spreading code, the power of the desired signal can be amplified by a process gain as compared with the power of an interference signal.

Meanwhile, as described above, de-spread signals $\underline{y}_k$ of the first multipath signals $\underline{x}_k$ are input into the signal processor 284. The signal processor 284 calculates the reception weight values $\underline{w}_{R,k}$ based on the de-spread signals $\underline{y}_k$ of the first multipath signals $\underline{x}_k$ and outputs the 4reception weight values $\underline{w}_{R,k}$ to the reception beam generator 285. That is, the signal processor 284 calculates an N-number of reception weight values $\underline{w}_{R,k}$ applied to the first multipath signals $\underline{x}_k$ output from the first to $N^{th}$ antennas 241 to 245 by using the de-spread signals $\underline{y}_k$ of the N-number of the first multipath signals $\underline{x}_k$. The reception beam generator 285 receives the de-spread signals $\underline{y}_k$ of the N-number of first multipath signals $\underline{x}_k$ and the N-number of the reception weight values $\underline{w}_{R,k}$. In addition, the reception beam generator 285 creates the reception beam by using the N-number of reception weight values $\underline{w}_{R,k}$. After that, the reception beam generator 285 outputs a signal as an output signal $z_k$ of the first finger 280-1 by combining the de-spread signals $\underline{y}_k$ of the N-number of the first multipath signals $\underline{x}_k$ with the reception weight values $\underline{w}_{R,k}$ of the reception beams. In addition, $\underline{z}_k$ which is a set of the output signals $z_k$ output from the N-number of the fingers of the base station receiver is finally input into the multipath combiner 291. The signal processor 284 calculates the transmission weight values $\underline{w}_{T,k}$ by using the reception weight values $\underline{w}_{R,k}$, and then, outputs the transmission weight values $\underline{w}_{T,k}$ to the feedback information generator 286. Thus, the feedback information generator 286 creates feedback information including the transmission weight values $\underline{w}_{R,k}$. Herein, the transmitter of the base station transmits the feedback information created from the feedback information generator 286. For example, such feedback information can be transmitted through a dedicated physical channel (DPCH).

Even though only the operation of the first finger 280-1 has been described above as an example, the other fingers may operate in the same manner as the first finger 280-1. Thus, the multipath combiner 291 receives the signals output from the first to $L^{th}$ fingers, combines the signals with each other through a multipath scheme, and outputs the signals to the de-interleaver 293. The de-interleaver 293 receives the signals output from the multipath combiner 291, de-interleaves the signals through a predetermined de-interleaving method corresponding to the interleaving method used in the transmitter, and outputs the signals to the decoder 295. Upon receiving the signals from the de-interleaver 293, the decoder 295 decodes the signals through a decoding method corresponding to the encoding method used in the transmitter and outputs signals as the final reception data.

FIG. 2 shows a case in which the receiver of the base station calculates the transmission weight values $\underline{w}_{T,k}$ and transmits the transmission weight values $\underline{w}_{T,k}$ to the transmitter of the base station. However, the receiver and the transmitter of the base station can be used as the receiver and the transmitter of the mobile station. That is, it is noted that the above description has been made in view of the creation and the transmission of the feedback information with reference to FIG. 2.

The structures of a transmitter and a receiver of a mobile station of a CDMA mobile communication system for performing the functions according to one embodiment of the present invention will be described with reference to FIG. 3.

Figure 3:
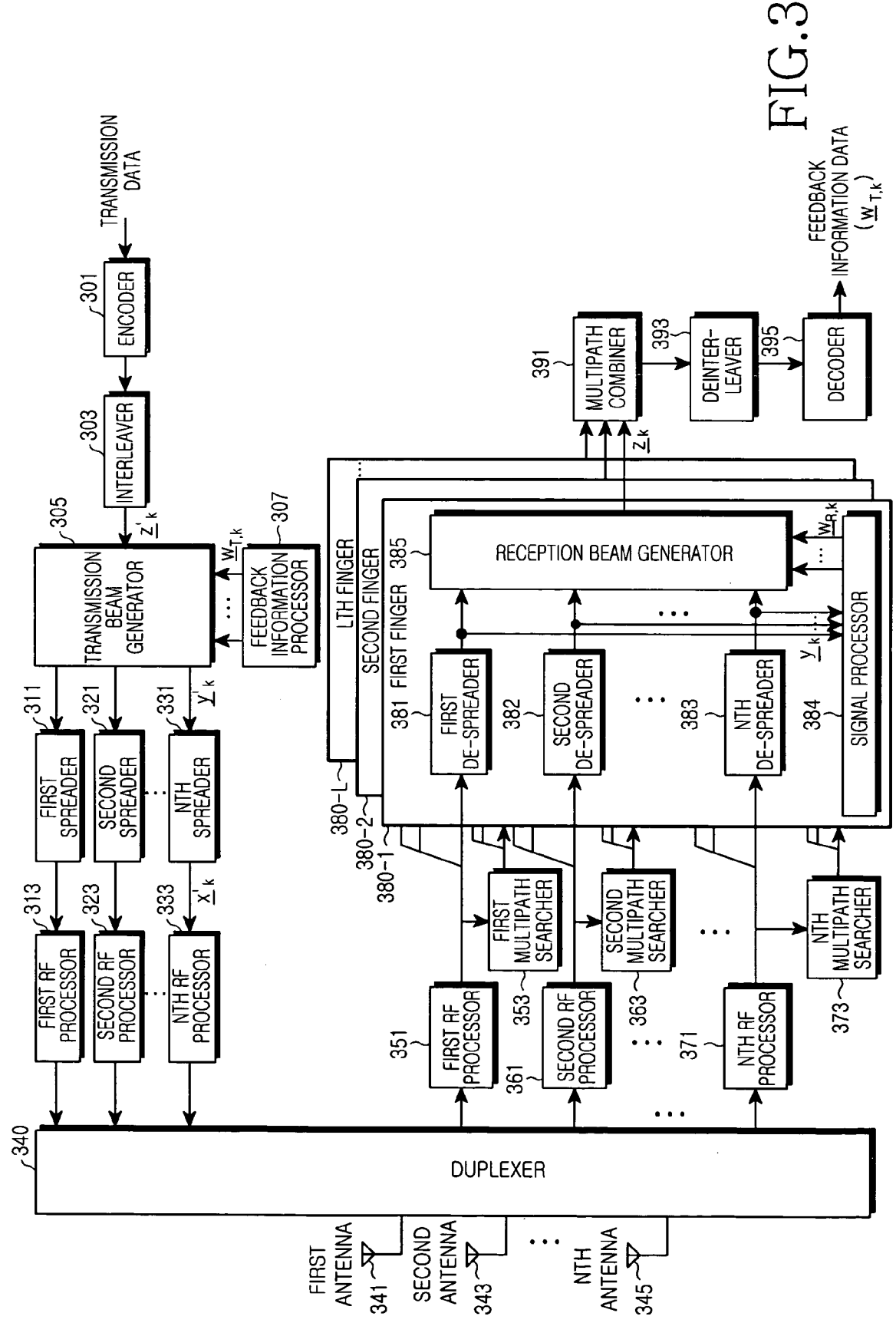
FIG. 3 is a block diagram of a transmitter and a receiver of a mobile station of a mobile communication system performing functions according to one embodiment of the present invention.

FIG. 3 is a block diagram of the transmitter and the receiver of the mobile station of the CDMA mobile communication system performing functions according to one embodiment of the present invention.

The structures of the transmitter and the receiver of the base station for performing the functions shown in FIG. 3 according to one embodiment of the present invention are identical to the structures of the transmitter and the receiver shown in FIG. 1, except for the inclusion of a feedback information processor 307, which is newly added to FIG. 3, and an operation of a transmission beam generator 305, which creates a transmission beam by using feedback transmission weight values.

Prior to explaining FIG. 3, it is noted that the following description is made on the assumption that the CDMA mobile communication system adopts the MIMO-AAA scheme. Accordingly, the transmitter and the receiver must have a plurality of transmission antennas and a plurality of reception antennas, respectively. According to FIG. 3, the transmitter and the receiver do not have separate transmission antennas and reception antennas, but the same antennas are used for both the transmitter and the receiver through a time division scheme by using a duplexer. In addition, according to FIG. 3, an N-number of antennas is used.

Firstly, the transmitter of the mobile station of the CDMA mobile communication system will be described.

Referring to FIG. 3, the transmitter includes an encoder 301, an interleaver 303, a transmission beam generator 305, a feedback information processor 307, a plurality of spreaders including a first to $N^{th}$ spreaders 311, 321, ..., and 331, and an N-number of RF processors including a first to $N^{th}$ RF processors 313, 323, ..., and 333. In addition, a duplexer 340 is commonly used for both the transmitter and the receiver, and an N-number of antennas including a first to $N^{th}$ antennas 341, 343, ..., and 345 are also commonly used for both the transmitter and the receiver. The structure and the operation of the encoder 301, the interleaver 303, the first to $N^{th}$ spreaders 311, 321, ..., and 331, and the first to $N^{th}$ RF processors 313, 323, ..., and 333 are identical to the structure and the operation of the encoder 201, the interleaver 203, the first to $N^{th}$ spreaders 211, 221, ..., and 231, and the first to $N^{th}$ RF processors 213, 223, ..., and 233 shown in FIG. 2. Thus, a detailed description thereof will be omitted.

The feedback information processor 307 analyzes feedback information received in the receiver of the mobile station so as to detect transmission weight values $\underline{w}_{T,k}$ included in the feedback information. In addition, the feedback information processor 307 sends the detected transmission weight values $\underline{w}_{T,k}$ to the transmission beam generator 305. A procedure of receiving the feedback information in the receiver of the mobile station will be described later, so a detailed description thereof will now be omitted. The transmission beam generator 305 creates a transmission beam corresponding to the transmission weight values $\underline{w}_{T,k}$.

The receiver of the mobile station of the CDMA mobile communication system will be described.

The receiver includes an N-number of RF processors including a first to $N^{th}$ RF processors 351, 361, ..., and 371, an N-number of multipath searchers including a first to $N^{th}$ multipath searchers 353, 363, ..., 373 corresponding to the RF processors, an L-number of fingers including first to $L^{th}$ fingers 380-1, 380-2, ..., 380-L for processing the signals regarding an L-number of multipaths, which are searched by the multipath searchers, a multipath combiner 391 for combining multipath signals output from the L-number of fingers, a de-interleaver 393, and a decoder 395. Herein, the structure and the operation of the first to $N^{th}$ RF processors 351, 361, ..., and 371, the first to $N^{th}$ multipath searchers 353, 363, ..., 373, the first to $L^{th}$ fingers 380-1, 380-2, ..., 380-L, the multipath combiner 391, the de-interleaver 393 and the decoder 395 are identical to the structure and the operation of the first to $N^{th}$ RF processors 251, 261, ..., and 271, the first to $N^{th}$ multipath searchers 253, 263, ..., 273, the first to $L^{th}$ fingers 280-1, 280-2, ..., 280-L, the multipath combiner 291, the de-interleaver 293 and the decoder 295 shown in FIG. 2. Thus, a detailed description thereof will be omitted. The reception data finally output from the decoder 395 is feedback information including the transmission weight values $\underline{w}_{T,k}$, and the feedback information output from the decoder 395 is input to the feedback information processor 307.

FIG. 3 shows a case in which the receiver of the mobile station receives the feedback information and the transmitter of the mobile station creates the transmission beam by using the transmission weight values $\underline{w}_{T,k}$ included in the feedback information. However, the receiver and the transmitter of the mobile station can be used as the receiver and the transmitter of the base station. That is, it is noted that the above description has been made in view of the reception of the feedback information including the transmission weight values $\underline{w}_{T,k}$ with reference to FIG. 3.

A structure of the signal processor will be described with reference to FIG. 4.

Figure 4:
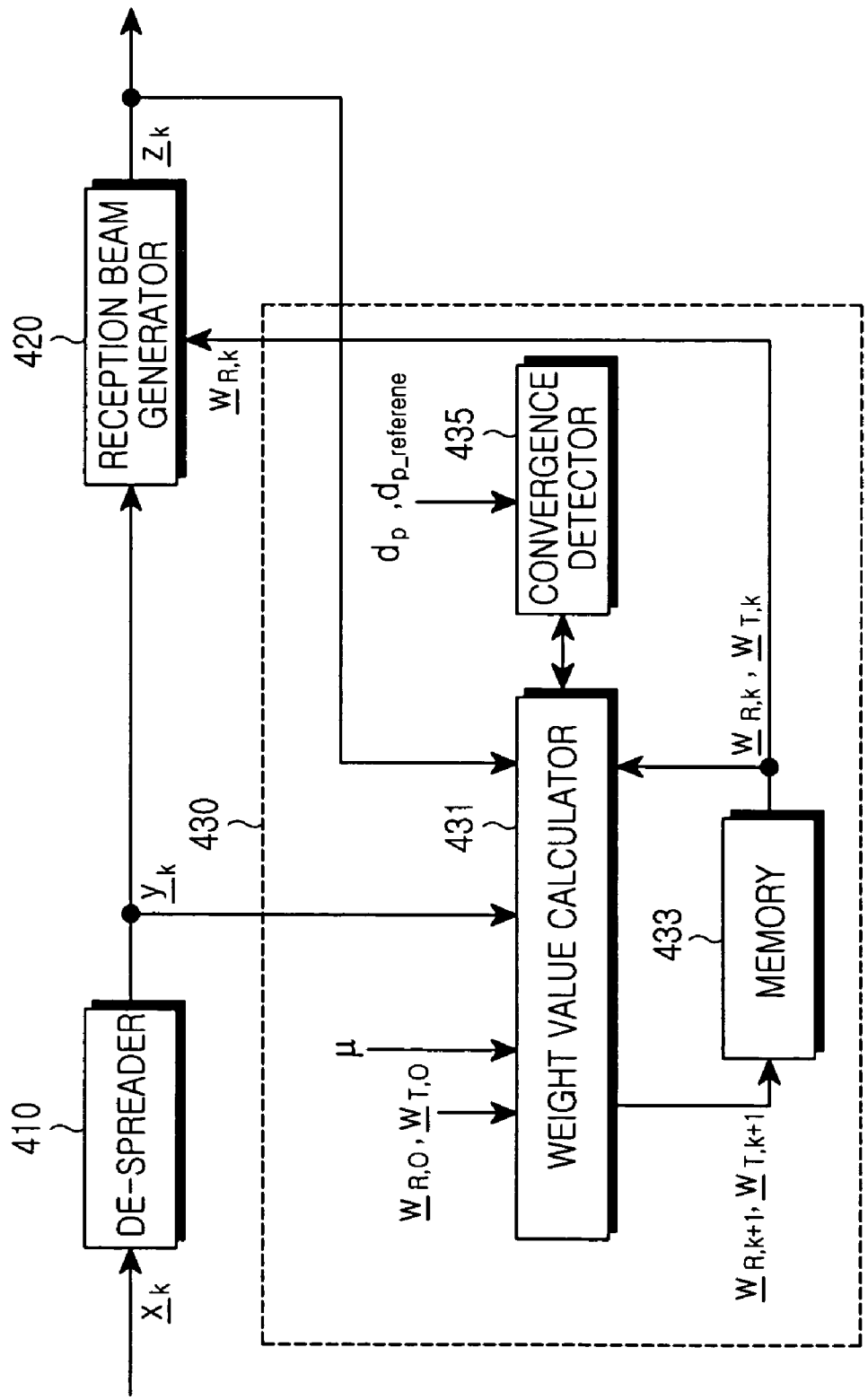
FIG. 4 is a block diagram of a signal processor performing functions according to one embodiment of the present invention.

FIG. 4 is a block diagram of the signal processor performing functions according to the present invention.

For the purpose of convenience of explanation, only parts of the receiver of the base station which are in direct relation to the present invention will be described with reference to FIG. 4. Since the above description has been made in relation to a case where the receiver of the base station calculates the transmission weight values $\underline{w}_{T,k}$, the description of the signal processor shown in FIG. 4 will be made in relation to the parts of the receiver of the base station. However, the signal processor shown in FIG. 4 may be adaptable for the receiver of the mobile station.

Referring to FIG. 4, when reception signals $\underline{x}_k$ are input into the receiver at a predetermined point (k), the de-spreader 410 de-spreads the reception signals $\underline{x}_k$ by using a predetermined de-spreading code and outputs the de-spread reception signals $\underline{y}_k$ to the signal processor 430 and the reception beam generator 420. The signal processor 430 includes a weight value calculator 431, a memory 433 and a convergence detector 435. For the purpose of the convenience of the explanation, the signal processor 430 shown in FIG. 4 will be described in relation to the structure of the first finger 280-1 of the base station receiver shown in FIG. 2. Thus, although only one de-spreader 410 is shown in FIG. 4, the de-spreader 410 may perform an operation substantially identical to the operation of the first to $N^{th}$ de-spreaders 281 to 283 of the first finger 280-1.

The weight value calculator 431 of the signal processor 430 receives the de-spread reception signals $\underline{y}_k$, calculates the reception weight values $\underline{w}_{R,k}$ and the transmission weight values $\underline{w}_{T,k}$ by applying a predetermined constant gain value μ, the initial weight values $\underline{w}_{R,0}$ and the output signals $z_k$ of the first finger 280-1 output from the reception beam generator 420 to the de-spread reception signals $\underline{y}_k$, and outputs the calculated reception weight values $\underline{w}_{R,k}$ and the transmission weight values $\underline{w}_{T,k}$ to the memory 433. Herein, the memory 433 performs a buffering operation for the reception weight values $\underline{w}_{R,k}$ and the transmission weight values $\underline{w}_{T,k}$ calculated by the weight value calculator 431, and the weight value calculator 431 may use the reception weight values $\underline{w}_{R,k}$ and the transmission weight values $\underline{w}_{T,k}$ stored in the memory 433 when updating the reception weight values $\underline{w}_{R,k}$ and the transmission weight values $\underline{w}_{T,k}$. That is, the weight value calculator 431 updates the reception weight values $\underline{w}_{R,k}$ and the transmission weight values $\underline{w}_{T,k}$ at a next point (k+1) by using the reception weight values $\underline{w}_{R,k}$ and the transmission weight values $\underline{w}_{T,k}$ calculated at a predetermined point (k). In addition, the weight value calculator 431 calculates the reception weight values $\underline{w}_{R,k}$ and the transmission weight values $\underline{w}_{T,k}$ under the control of the convergence detector 435. That is, the convergence detector 435 may control a calculation scheme of the weight value calculator 431 when the weight value calculator 431 calculates the reception weight values $\underline{w}_{R,k}$ and the transmission weight values $\underline{w}_{T,k}$. Herein, the reception weight values $\underline{w}_{R,k}$ and transmission weight values $\underline{w}_{T,k}$ may be calculated through the CM scheme or the DD scheme. A procedure of selecting the CM scheme or the DD scheme by using the convergence detector 435 will be described.

As mentioned above, the present invention may obtain the desired reception signal d(k) through the two-step LMS method including the signal convergence step and the signal stabilization step. The CM scheme is disadvantageous in that a signal is converged with a low speed. In addition, the DD scheme may fail to converge the signal if a channel is subject to a fast fading environment, such as a fast fading channel, or a higher order modulation environment. According to the present invention, the CM scheme and the DD scheme are used in the signal convergence step and the signal stabilization step to match with the characteristics thereof, thereby allowing signals to be rapidly converged into a relatively small MSE value. The signal convergence step and the signal stabilization step are very important factors for improving performance.

According to the present invention, the two-step LMS method is divided into the signal convergence step and the signal stabilization step through the following method.

Firstly, the MSE is defined as "$S_t$" in a time domain (herein, t=1, 2, 3, 4 . . . ). $S_t$ represents the MSE of a signal received at a predetermined point of time (t). In this case, as a basis for dividing the two-step LMS method into the signal convergence step and the signal stabilization step, a difference between $S_t$ of a present point (t=t) and $S_{t-1}$ of a next point (t=t−1) is defined as "$d_t$". The difference $d_t$ between the $S_t$ and $S_{t-1}$ satisfies following Equation 31.

$$d_t = \frac{\sum_{l=1}^{l=M} |z_{M*(t-1)+l} - d_{M*(t-1)+l}|}{M} - \frac{\sum_{l=1}^{l=M} |z_{M*(t-2)+l} - d_{M*(t-2)+l}|}{M} \quad (31)$$

When $d_t$ has a value equal to or less than an absolute value of a predetermined first critical value $d_p$ ($d_t \leq |d_p|$), the signal convergence step is shifted to the signal stabilization step. The first critical value $d_p$ is preset in the OFDM mobile communication system with a proper value. As a result, if the difference $d_t$ between the $S_t$ and $S_{t-1}$ is very small, the signal convergence step is shifted to the signal stabilization step.

A step transition from the signal convergence step to the signal stabilization step will be described with reference to FIG. 8.

Figure 8:
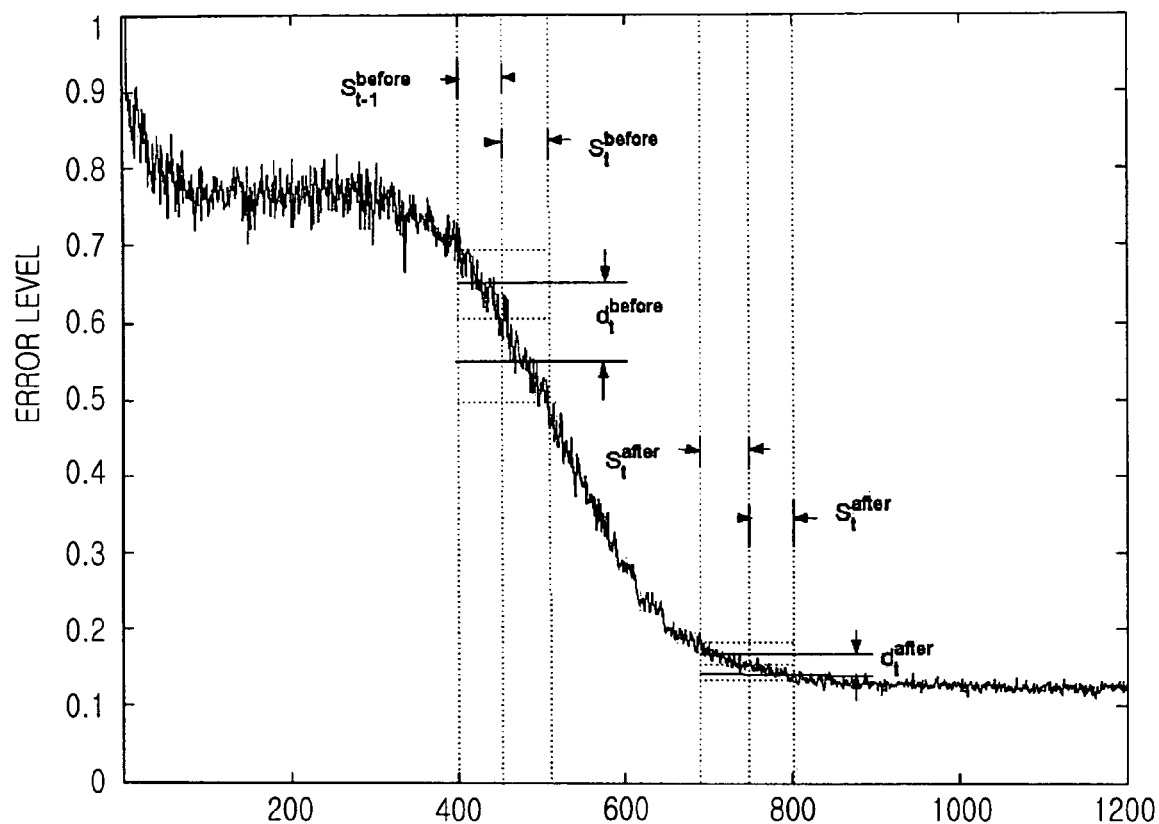
FIG. 8 is a graph of a condition for a step transition from a signal convergence step to a signal stabilization step according to one embodiment of the present invention.

FIG. 8 is a graph of the step transition from a signal convergence step to a signal stabilization step according to one embodiment of the present invention.

Referring to FIG. 8, $d_t^{before}$ represents a differential value between $S_{t-1}^{before}$, which is an MSE of the reception signal at a point of t−1 of a previous period, and $S_t^{before}$, which is an MSE of the reception signal at a point of t of the previous period. In addition, $d_t^{after}$ represents a differential value between $S_{t-1}^{after}$, which is an MSE of the reception signal at a point of t−1 of a present period, and $S_t^{after}$, which is an MSE of the reception signal at a point of t of the present period. In FIG. 8, a vertical axis shows an error level and a horizontal axis shows the number of iterations. In addition, the previous period represents a lesser number of iterations and the present period represents a relatively large number of iterations. Since the differential value $d_t^{before}$ between $S_{t-1}^{before}$ and $S_t^{before}$ of the previous period exceeds an absolute value of the first critical value $d_p$, the signal convergence step is applied to the previous period. In addition, since the differential value $d_t^{after}$ between $S_{t-1}^{after}$ and $S_t^{after}$ of the present period is less than the absolute value of the first critical value $d_p$, it is determined that the signal convergence has been achieved in the present period, so the signal convergence step is shifted to the signal stabilization step in the present period. However, if the step transition from the signal convergence step to the signal stabilization step is carried out only on the basis of the absolute value of the first critical value $d_p$, it is difficult to discriminate the present region from an initial convergence region. For this reason, another setting value, that is, a second critical value $d_{p\_reference}$ is set for the purpose of the step transition from the signal convergence step to the signal stabilization step. That is, the above step transition is carried out only when the differential value $d_t$ is equal to or less than the absolute value of the first critical value $d_p$, and a value of $S_t$ is less than the second critical value $d_{p\_reference}$ ($d_t \leq |d_p|, S_t < d_{p\_reference}$).

In short, the convergence detector 435 shown in FIG. 4 determines whether or not the MSE value of the signal is converged into the predetermined first critical value $d_p$ based on the difference value $d_t$ between $S_t$ and $S_{t-1}$, and controls the weight value calculator 431 to use the CM scheme or the DD scheme by comparing the value of $S_t$ with the second critical value $d_{p\_reference}$. That is, the convergence detector 435 controls the weight value calculator 431 to use the CM scheme in the signal convergence step and controls the weight value calculator 431 to use the DD scheme in the signal stabilization step.

Hereinafter, a procedure for transmitting/receiving data using the MIMO-AAA scheme according to one embodiment of the present invention will be described with reference to FIG. 5.

Figure 5:
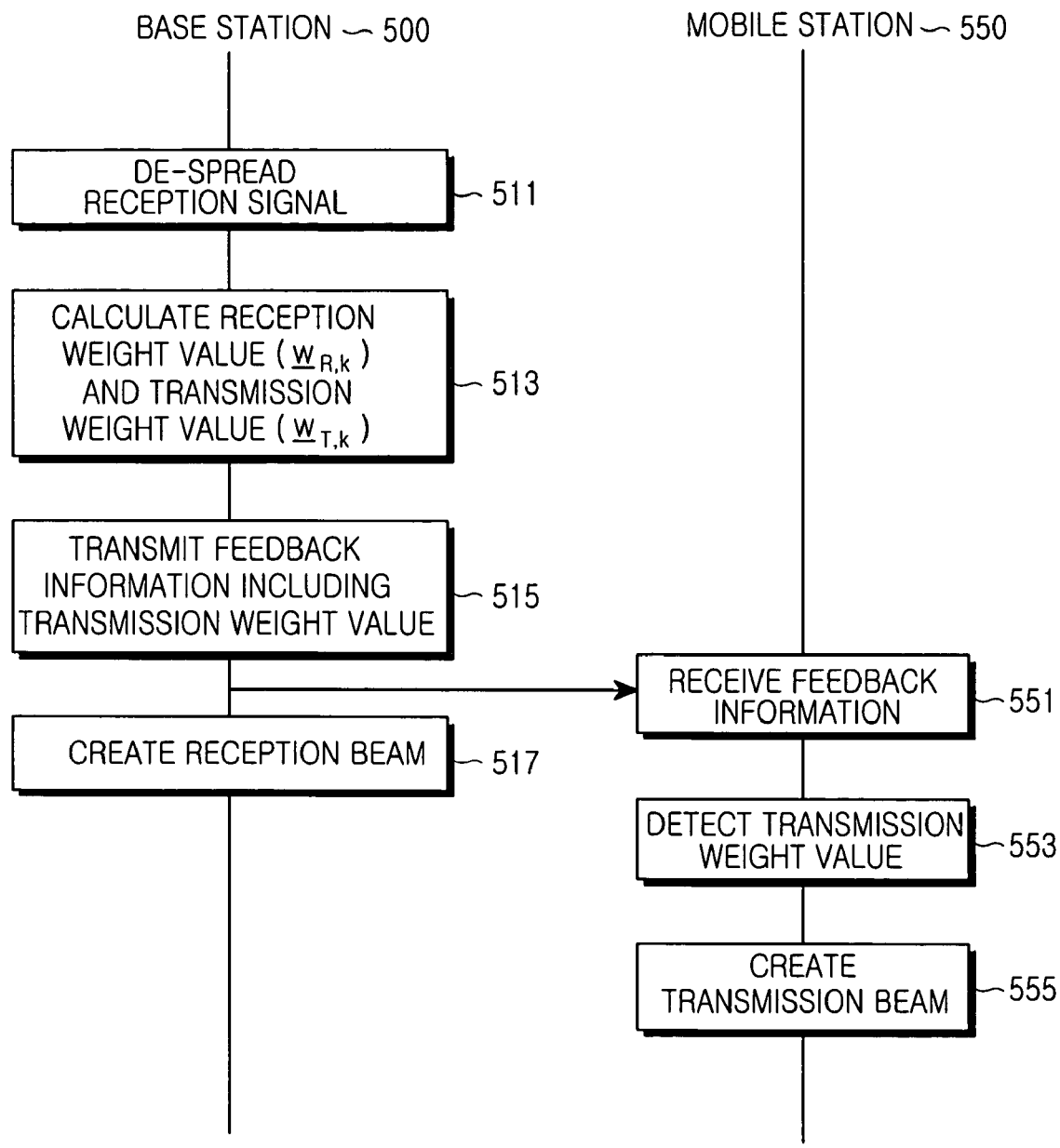
FIG. 5 is a flow diagram of a data transmitting/receiving procedure using an MIMO-AAA scheme according to one embodiment of the present invention.

FIG. 5 is a flow diagram of a data transmitting/receiving procedure using the MIMO-AAA scheme according to one embodiment of the present invention.

Referring to FIG. 5, a base station 500 de-spreads reception signals (step 511), and calculates the reception weight values $\underline{w}_{R,k}$ and the transmission weight values $\underline{w}_{T,k}$ by using the de-spread reception signals (step 513). In addition, the base station 500 creates the feedback information including the transmission weight values $\underline{w}_{T,k}$ and sends the feedback information to a mobile station 550 (step 515). A reception beam is created in the base station 500 (step 517). The mobile station 550 receives the feedback information from the base station 500 (step 551) and detects the transmission weight values $\underline{w}_{T,k}$ from the feedback information (step 553). The mobile station 550 creates a transmission beam by using the detected transmission weight values $\underline{w}_{T,k}$ (step 555). Although FIG. 5 shows a case in which the base station 500 feeds the transmission weight values $\underline{w}_{T,k}$ to the mobile station 550 and the mobile station 550 creates the transmission beam by using the transmission weight values $\underline{w}_{T,k}$, it is also possible to allow the mobile station 550 to feed the transmission weight values $\underline{w}_{T,k}$ to the base station 500 and allow the base station 500 to create the transmission beam by using the transmission weight values $\underline{w}_{T,k}$.

A signal receiving procedure of a base station receiver according to one embodiment of the present invention will be described with reference to FIG. 6.

Figure 6:
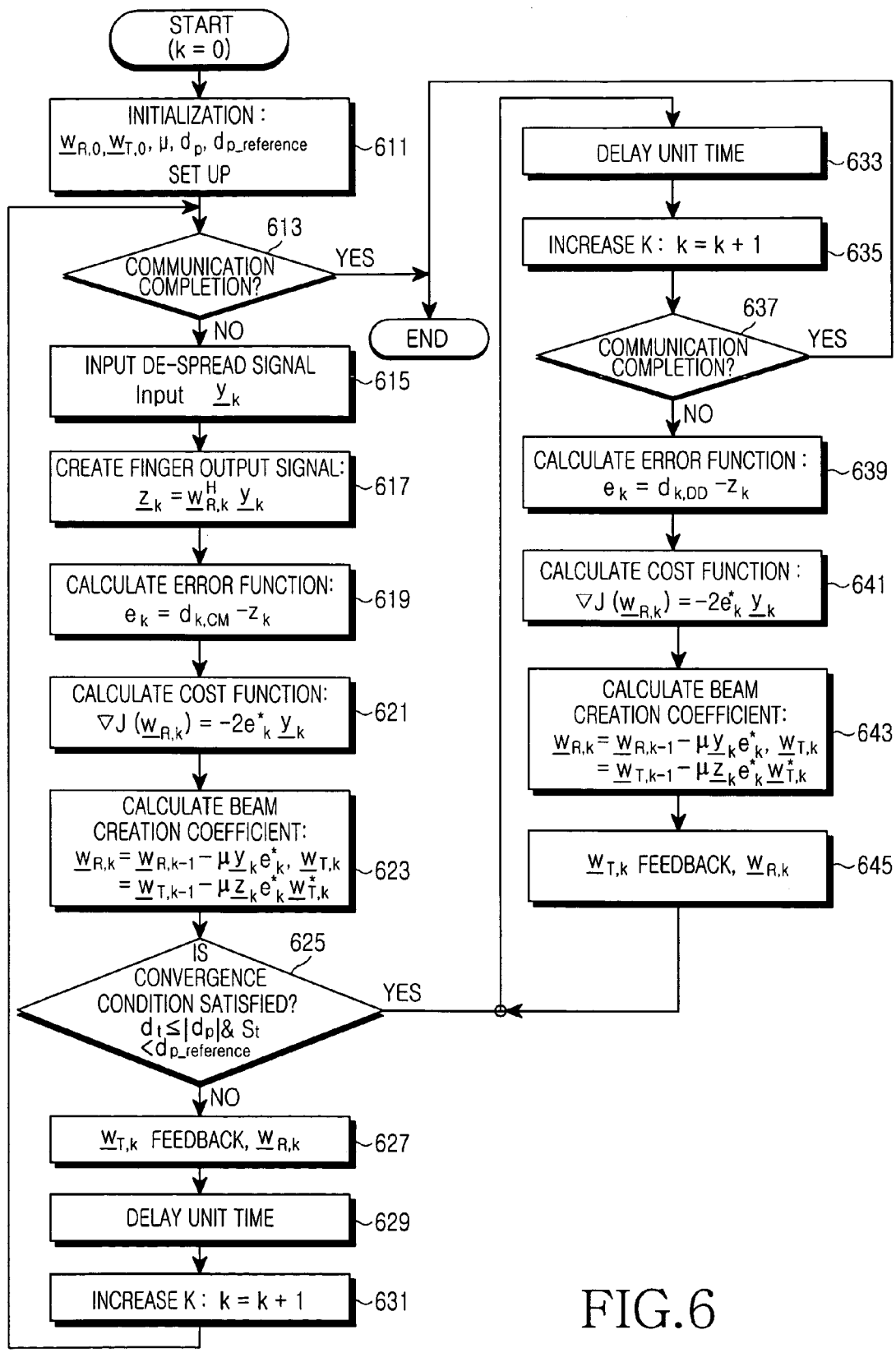
FIG. 6 is a flowchart of a signal receiving procedure of a base station receiver according to one embodiment of the present invention.

FIG. 6 is a flowchart showing the signal receiving procedure of the base station receiver according to one embodiment of the present invention.

Since FIG. 2 shows a case in which the base station receiver creates the feedback information, the signal receiving procedure of the base station receiver will be described with reference to FIG. 6. It is noted that the same signal receiving procedure may be realized even if the mobile station receiver creates the feedback information. Referring to FIG. 6, the base station receiver sets up the initial weight values $\underline{w}_{R,0}$, $\underline{w}_{T,0}$, the constant gain value $\mu$, the first critical value $d_p$, and the second critical value $d_{p\_reference}$ (step 611). After that, step 613 is carried out. In step 613, the base station receiver checks whether or not the communication has been completed. If the communication has been completed, the base station receiver finishes the signal receiving procedure.

If it is determined that the communication has not been completed in step 613, step 615 is carried out. The base station receiver receives the de-spread signals $\underline{y}_k$ of the reception signals $\underline{x}_k$ in step 615. In step 617, the base station receiver calculates $\underline{z}_k$, which is a set of the output signals $z_k$ output from each of the fingers provided in the base station receiver, by using the de-spread signals $\underline{y}_k$ and the reception weight values $\underline{w}_{R,k}$ ($\underline{z}_k = \underline{w}_k^H \underline{y}_k$). Herein, $\underline{z}_k$ is a set of the output signals of the fingers generated by the reception beam, which is created by using the reception weight values $\underline{w}_{R,k}$.

The base station receiver calculates the output signals $\underline{z}_k$ of the fingers provided in the base station receiver by using the de-spread signals $\underline{y}_k$ and the weight values $\underline{w}_k$ in step 617, and then, goes to step 619. Herein, $\underline{z}_k$ is a set of the output signals of the fingers generated by the reception beam, which is created by using the weight values $\underline{w}_k$.

At this time, since the base station receiver is positioned in an initial stage, the base station may exist in the signal convergence step. Thus, in step 619, the base station receiver calculates the error function $e_k$, which is a difference between the received signal $\underline{x}_k$ and the desired signal $d_k$, according to the CM scheme ($e_k = d_{k,CM} - z_k$).

In step 621, the base station receiver calculates a differential value of the cost function by using the de-spread signals $\underline{y}_k$ and the error function $e_k$, ($\nabla J(\underline{w}_{R,k}) = -2e^*_k \underline{y}_k$).

In step 623, the base station receiver calculates a beam creation coefficient, that is, calculates the reception weight value $\underline{w}_{R,k}$ and the transmission weight values $\underline{w}_{T,k}$ ($\underline{w}_{R,k} = \underline{w}_{R,k-1} - \mu \, \underline{y}_k e^*_k$, $\underline{w}_{T,k} = \underline{w}_{T,k-1} - \mu \, \underline{z}_k e^*_k \underline{w}_{T,k}^*$). In step, 625, the base station receiver checks whether or not the differential value $d_t$ between $S_t$ and $S_{t-1}$ and the value of $S_t$ satisfy a signal convergence condition, that is, checks whether or not the differential value $d_t$ is equal to or less than the first critical value $d_p$, and the value of $S_t$ is less than the second critical value $d_{p\_reference}$ ($d_t \leq |d_p|, S_t < d_{p\_reference}$). If the differential value $d_t$ and the value of $S_t$ do not satisfy the signal convergence condition, that is, if the differential value $d_t$ exceeds the first critical value $d_p$, or the value of $S_t$ is equal to or greater than the second critical value $d_{p\_reference}$, the base station goes to step 627. In step 627, the base station receiver transmits the calculated transmission weight values $\underline{w}_{T,k}$ to the mobile station transmitter while maintaining the calculated reception weight values $\underline{w}_{R,k}$. In step 629, the base station receiver delays a predetermined unit time and goes to step 631. Herein, the delay for the predetermined unit time is required for allowing a value determined in a $k^{th}$ snap to be used in a $(k+1)^{th}$ snap, that is, the delay for the predetermined unit of time is necessary in order to consider a state transition delay time. In step 631, the base station receiver increases the value of k by 1, that is, the present point (k) is shifted into the next point (k+1), and then, the base station receiver returns to step 613.

In the meantime, if the differential value $d_t$ is equal to or less than the first critical value $d_p$ and the value of $S_t$ is less than the second critical value $d_{p\_reference}$ in step 625, the base station receiver goes to step 633. In step 633, the base station receiver delays a predetermined unit of time and goes to step 635. The delay for the predetermined unit of time is necessary in order to consider a state transition delay time. In step 635, the base station receiver increases the value of k by 1, that is, the present point (k) is shifted into the next point (k+1), and then, the base station receiver returns to step 637. In step 637, the base station receiver checks whether or not the communication has been completed. If the communication has been completed, the base station receiver finishes the signal receiving procedure.

If it is determined that communication has not been completed in step 637, step 639 is carried out.

In step 639, since the base station receiver may exist in the signal stabilization step, the base station receiver calculates the error function $e_k$, which is a difference between the received signal $\underline{x}_k$ and the desired signal $d_k$, according to the DD scheme ($e_k = d_{k,DD} - z_k$). In step 641, the base station receiver calculates a differential value of the cost function by using the de-spread signals $\underline{y}$ and the error function $e_k$ ($\nabla J(\underline{w}_{R,k}) = -2e^*_k \underline{y}_k$). In step 643, the base station receiver calculates a beam creation coefficient, that is, calculates the weight values ($\underline{w}_{R,k} = \underline{w}_{R,k-1} - \mu \, \underline{y}_k e^*_k$, $\underline{w}_{T,k} = \underline{w}_{T,k-1} - \mu \, \underline{z}_k e^*_k \underline{w}_{T,k}^*$). In step, 645, the base station receiver transmits the calculated transmission weight values $\underline{w}_{T,k}$ to the mobile station transmitter while maintaining the calculated reception weight values $\underline{w}_{R,k}$, After that, the base station receiver returns to step 633.

A simulation result for the characteristics of the two-step weight value creation method according to the present invention will be described with reference to FIG. 9 when smart antennas are used as the reception antennas.

Figure 9:
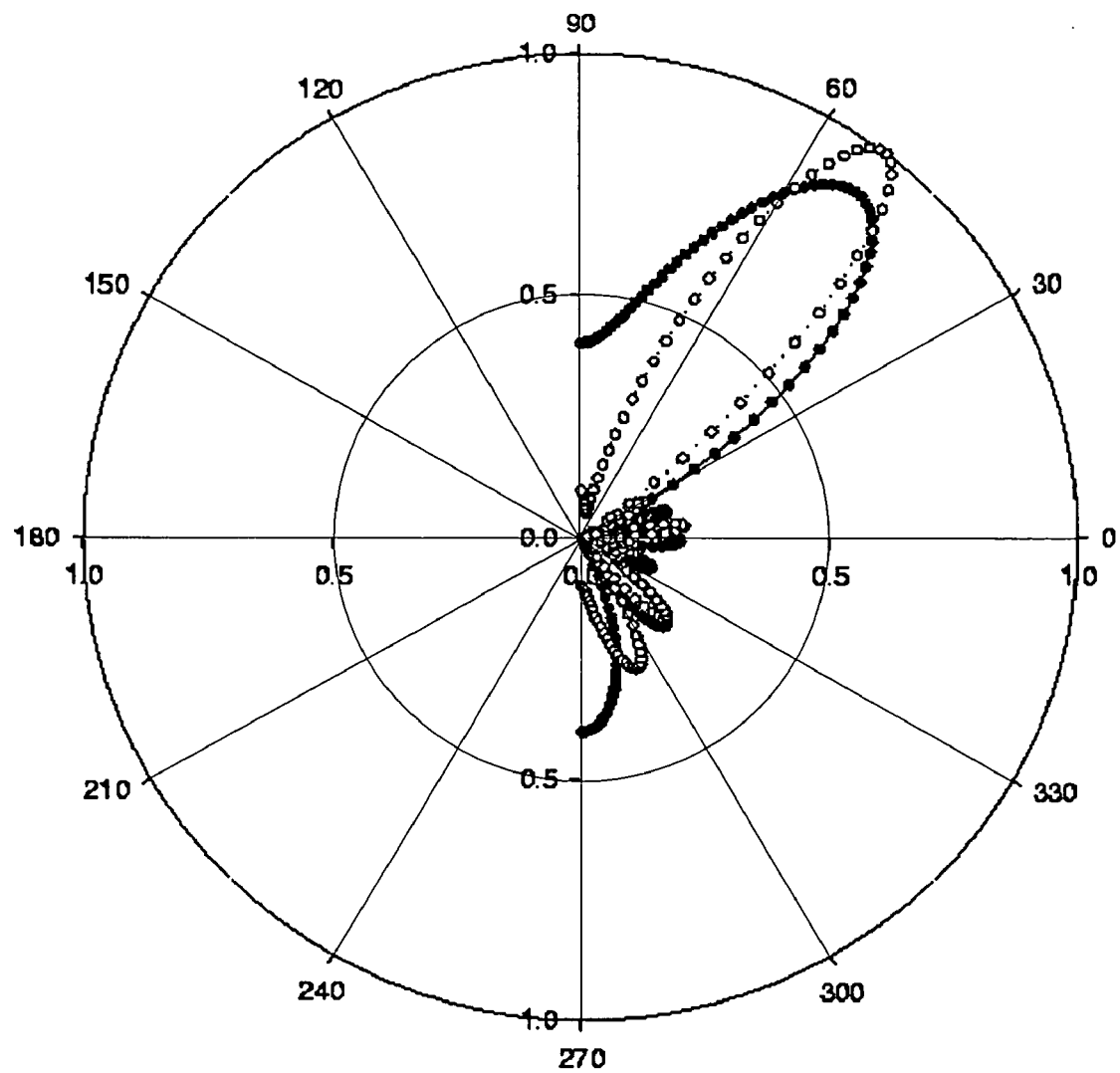
FIG. 9 is a graph of a characteristic curve of a two-step weight value creation method of the present invention according the number of reception antennas of a base station.

FIG. 9 is a graph showing a characteristic curve of the two-step weight value creation method of the present invention according the number of reception antennas of the base station. FIG. 9 shows radiation patterns represented when six reception antennas or ten reception antennas are provided in the base station receiver. For instance, if a predetermined mobile station is positioned at a point of 57°, a normalized antenna gain may increase by 0.2 when providing ten antennas in the base station receiver as compared with a case in which six antennas are provided in the base station receiver. In addition, it is possible to precisely create the reception beam when providing ten antennas in the base station receiver. In view of the system capacity of the mobile communication system, the intensity of the reception signal can be greatly amplified as the number of the reception antennas increases, so that it is possible to precisely provide the communication services and to increase the system capacity.

Structures of a base station transmitter and a base station receiver of an OFDM mobile communication system performing functions according to one embodiment of the present invention will be described with reference to FIG. 10.

Figure 10:
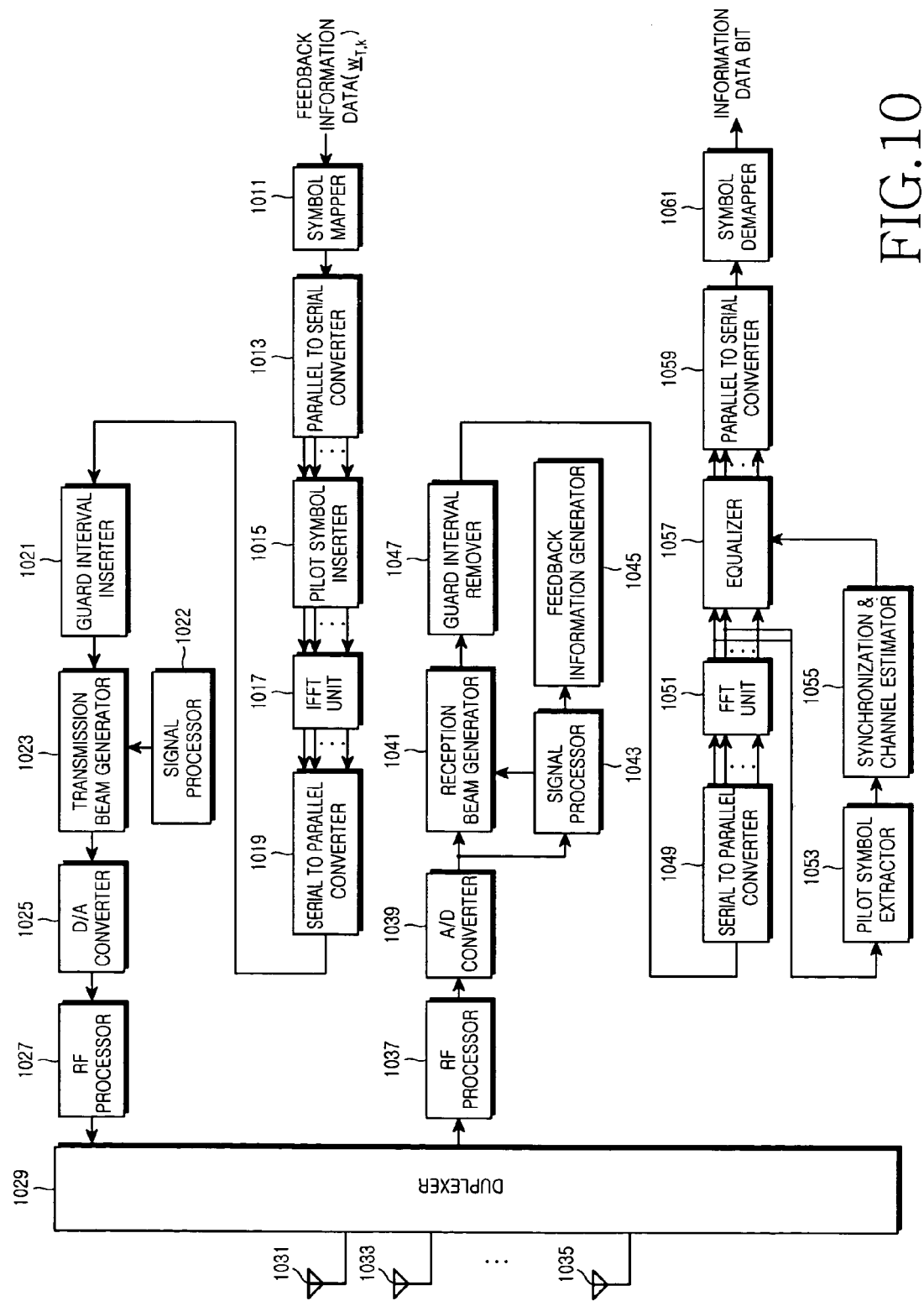
FIG. 10 is a block diagram of a base station transmitter and a base station receiver of an OFDM mobile communication system performing functions according to one embodiment of the present invention.

FIG. 10 is a block diagram of the base station transmitter and the base station receiver of the mobile communication system performing functions according to one embodiment of the present invention.

Prior to explaining FIG. 10, it is noted that the base station transmitter and the base station receiver shown in FIG. 10 may be operated in the substantially same manner as the base station transmitter and the base station receiver of the CDMA mobile communication system described with reference to FIG. 2 even though the structures of the base station transmitter and the base station receiver shown in FIG. 10 are different from the structures of the base station transmitter and the base station receiver shown in FIG. 2. Similar to the base station transmitter and the base station receiver of the CDMA mobile communication system, the base station transmitter and the base station receiver of the OFDM mobile communication system can calculate the reception weight values $\underline{w}_{R,k}$ and the transmission weight values $\underline{w}_{T,k}$ and can transmit the calculated transmission weight values $\underline{w}_{T,k}$ to the mobile station. In addition, it is also noted that the following description is made on the assumption that the OFDM mobile communication system adopts the MIMO-AAA scheme. The transmitter and the receiver must have a plurality of transmission antennas and a plurality of reception antennas, respectively. However, according to FIG. 10, the transmitter and the receiver do not have separate transmission antennas and reception antennas, but the same antennas are used for both the transmitter and the receiver through a time division scheme by using a duplexer. In addition, according to FIG. 10, an N-number of antennas is used.

The transmitter of the base station (that is, the base station transmitter) provided in the OFDM mobile communication system will be described.

Referring to FIG. 10, the base station transmitter includes a symbol mapper 1011, a serial to parallel converter 1013, a pilot symbol inserter 1015, an inverse fast Fourier transform unit 1017 (hereinafter, simply refereed to as "IFFT unit"), a parallel to serial converter 1019, a guard interval inserter 1021, a transmission beam generator 1023, a signal processor 1022, a digital to analog converter 1025, and an RF processor 1027. In addition, a duplexer 1029 is commonly used for both the base station transmitter and the base station receiver and an N-number of antennas including a first to $N^{th}$ antennas 1031, 1033, ..., and 1035 are also commonly used for both the base station transmitter and the base station receiver.

Firstly, if information data bits to be transmitted are created, that is, if the feedback information data including the transmission weight values $\underline{w}_{T,k}$ are created, the feedback information data are input into the symbol mapper 1011. Upon receiving the feedback information data, the symbol mapper 1011 modulates the feedback information data through a predetermined modulation method in order to achieve a symbol transform with respect to the feedback information data, and outputs the serial modulation symbols to the serial to parallel converter 1013. Herein, the predetermined modulation method may include a QPSK (quadrature phase shift keying) method or a 16 QAM (quadrature amplitude modulation) method. Upon receiving the serial modulation symbols from the symbol mapper 1011, the serial to parallel converter 1013 converts the serial modulation symbols into parallel modulation symbols and outputs the parallel modulation symbols to the pilot symbol inserter 1015. Then, the pilot symbol inserter 1015 inserts pilot symbols into the parallel modulation symbols output from the serial to parallel converter 1013, and outputs to the IFFT unit 1017 the parallel modulation symbols having the pilot symbols.

Upon receiving the signal from the pilot symbol inserter 1015, the IFFT unit 1017 performs N-point IFFT with respect to the signal and outputs the transformed signal to the parallel to serial converter 1019. The parallel to serial converter 1019 receives the signal output from the IFFT unit 1017, converts the parallel signal to a serial signal and outputs the serial signal to the guard interval inserter 1021. Upon receiving the serial signal from the parallel to serial converter 1019, the guard interval inserter 1021 inserts a guard interval signal into the serial signal and outputs the signal including the guard interval signal to the signal processor 1022. The signal processor 1022 calculates a weight value by considering the signal output from the guard interval inserter 1021 and outputs the signal to the transmission beam generator 1023. Then, the transmission beam generator 1023 generates a transmission beam by taking into consideration the signal output from the guard interval inserter 1021 and the weight value calculated in the signal processor 1022 and outputs the transmission beam to the digital to analog converter 1025 such that the transmission beam can be transmitted to each of the first to $N^{th}$ antennas 1031, 1033, ..., and 1035. The transmission beam generator 1023 may create the transmission beam by separately calculating the weight values for the transmission beam. A detailed procedure of creating the transmission beam does not directly relate to the present invention, so it will not be further described. Of course, if the base station receiver has previously received the feedback information data from the mobile station transmitter, the transmission beam generator 1023 may create the transmission beam by using the transmission weight value $\underline{w}_{T,k}$ contained in the feedback information data. In addition, an guard interval must be inserted into the signal to be transmitted in order to prevent interference between the previous OFDM symbols transmitted at a previous OFDM symbol transmission time and the present OFDM symbols to be transmitted at a present OFDM symbol transmission time, when transmitting the OFDM symbols in the OFDM mobile communication system. The guard interval may be inserted into the signal through a "cyclic prefix" method in which predetermined aft samples of the OFDM symbols provided in a time region are copied so as to be inserted into an effective OFDM symbol, or through a "cyclic postfix" method in which predetermined fore samples of the OFDM symbols provided in the time region are copied so as to be inserted into the effective OFDM symbol. The digital to analog converter 1025 receives the signal output from the transmission beam generator 1023 and converts the signal into an analog signal. The digital to analog converter 1025 outputs the analog signal to the RF processor 1027. The RF processor 1027 may include a filter and a front end unit in order to perform an RF process with respect to the signal output from the digital to analog converter 1025 in such a manner that the signal can be transmitted through air. The RF processor 1027 outputs the signal to the duplexer 1029. The duplexer 1029 receives the signal from the RF processor 1027 and transmits the signal into air through the antennas at corresponding signal transmission times.

The receiver of the base station (that is, the base station receiver) provided in the OFDM mobile communication system will be described.

The base station receiver includes the duplexer 1029, an RF processor 1037, an analog to digital converter 1039, a reception beam generator 1041, a signal processor 1043, a guard interval remover 1047, a serial to parallel converter 1049, a fast Fourier transform unit 1051 (hereinafter referred to as "FFT unit"), a pilot symbol extractor 1053, a synchronization & channel estimator 1055, an equalizer 1057, a parallel to serial converter 1059, and a symbol demapper 1061.

Firstly, the signal transmitted from the mobile station transmitter is received in the base station receiver through the antennas of the base station receiver while passing over a multipath channel at which noise is added to the signal. The signal received in the base station receiver through the antennas is input into the duplexer 1029. Then, the duplexer 1029 outputs to the RF processor 1037 the signal, which has been received in the base station receiver through the antennas at a corresponding signal receiving time. Upon receiving the signal from the duplexer 1029, the RF processor 1037 down-converts the signal such that the signal has an intermediate frequency band and outputs the down-converted signal to the analog to digital converter 1039. The analog to digital converter 1039 converts the analog signal output from the RF processor 1037 into a digital signal and outputs the digital signal to the reception beam generator 1041 and the signal processor 1043. Upon receiving the signal from the analog to digital converter 1039, the signal processor 1043 calculates the reception weight values $\underline{w}_{R,k}$, and then, calculates the transmission weight values $\underline{w}_{T,k}$ by using the reception weight values $\underline{w}_{R,k}$. After that, the signal processor 1043 outputs the transmission weight values $\underline{w}_{T,k}$ to the feedback information generator 1045. The feedback information generator 1045 creates the feedback information including the transmission weight values $\underline{w}_{T,k}$. The feedback information created from the feedback information generator 1045 is transmitted from the base station transmitter. For example, such feedback information can be transmitted through a dedicated physical channel.

Meanwhile, the signal output from the reception beam generator 1041 is input into the guard interval remover 1047. That is, the guard interval remover 1047 receives the signal from the reception beam generator 1041 in order to remove the guard interval signal. After that, the guard interval remover 1047 outputs the signal to the serial to parallel converter 1049. The serial to parallel converter 1049 converts the serial signal output from the guard interval remover 1047 into a parallel signal and outputs the parallel signal to the FFT unit 1051. Upon receiving the parallel signal from the guard interval remover 1047, the IFFT unit 1047 performs N-point IFFT with respect to the parallel signal and outputs the transformed signal to the equalizer 1057 and the pilot symbol extractor 1053. The equalizer 1057 receives the signal output from the IFFT unit 1047 and performs a channel equalization with respect to the signal. After the channel equalization has been completed, the equalizer 1057 outputs the signal to the parallel to serial converter 1059. The parallel to serial converter 1059 receives the parallel signal from the equalizer 1057 and converts the parallel signal into the serial signal. Then, the parallel to serial converter 1059 outputs the serial signal to the symbol demapper 1061. Upon receiving the signal from the parallel to serial converter 1059, the demapper 1061 demodulates the signal through a predetermined demodulation method corresponding to the modulation method applied to the mobile station transmitter, thereby outputting reception information data bits.

In addition, the signal output from the FFT unit 1051 is input into the pilot symbol extractor 1053. The pilot symbol extractor 1053 detects pilot symbols from the signal output from the FFT unit 1051 and outputs the detected pilot symbols to the synchronization & channel estimator 1055. The synchronization and channel estimator 1055 performs synchronization & channel estimation by using the pilot symbols output from the pilot symbol extractor 1053 and outputs data thereof to the equalizer 1057.

FIG. 10 shows a case in which the base station receiver calculates the transmission weight values $\underline{w}_{T,k}$ and transmits the transmission weight values $\underline{w}_{T,k}$ to the base station transmitter. However, the base station receiver and the base station transmitter can be used as the mobile station receiver and the mobile station transmitter, respectively. That is, it is noted that the above description has been made in view of the creation and the transmission of feedback information with reference to FIG. 10.

The structures of a mobile station transmitter and a mobile station receiver of an OFDM mobile communication system for performing the functions according to one embodiment of the present invention will be described with reference to FIG. 11.

Figure 11:
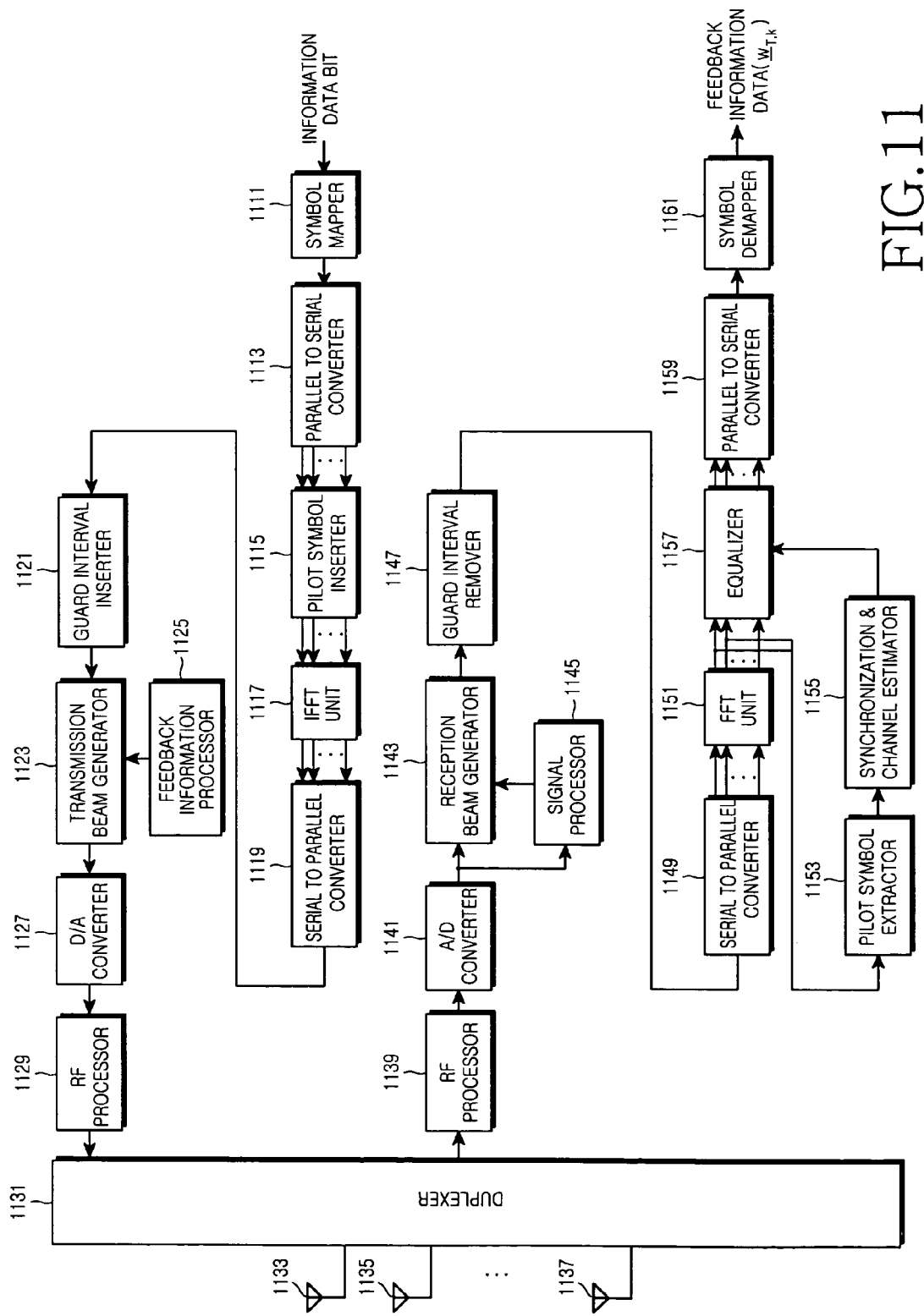
FIG. 11 is a block diagram of a mobile station transmitter and a mobile station receiver of an OFDM mobile communication system performing functions according to one embodiment of the present invention.

FIG. 11 is a diagram structures of the mobile station transmitter and the mobile station receiver of the OFDM mobile communication system performing functions according to one embodiment of the present invention.

Prior to explaining FIG. 11, it is noted that the following description is made on the assumption that the OFDM mobile communication system adopts the MIMO-AAA scheme. Accordingly, the transmitter and the receiver must have a plurality of transmission antennas and a plurality of reception antennas, respectively. However, according to FIG. 11, the transmitter and the receiver do not have separate transmission antennas and reception antennas, but the same antennas are used for both the transmitter and the receiver through a time division scheme by using a duplexer. In addition, according to FIG. 11, an N-number of antennas is used.

The transmitter of the mobile station (that is, the mobile station transmitter) provided in the OFDM mobile communication system will be described.

Referring to FIG. 11, the mobile station transmitter includes a symbol mapper 1111, a serial to parallel converter 1113, a pilot symbol inserter 1115, an IFFT unit 1117, a parallel to serial converter 1119, a guard interval inserter 1121, a transmission beam generator 1123, a feedback information processor 1125, a digital to analog converter 1127, and an RF processor 1129. In addition, a duplexer 1131 is commonly used for the mobile base station transmitter and the mobile station receiver, and an N-number of antennas including a first to $N^{th}$ antennas 1133, 1135, ..., and 1137 are also commonly used for both the mobile station transmitter and the mobile station receiver. The operation and the structure of the symbol mapper 1111, the serial to parallel converter 1113, the pilot symbol inserter 1115, the IFFT unit 1117, the parallel to serial converter 1119, the guard interval inserter 1121, the transmission beam generator 1123, the digital to analog converter 1127, the RF processor 1129 and the duplexer 1131 are identical to the operation and the structure of the symbol mapper 1011, the serial to parallel converter 1013, the pilot symbol inserter 1015, the IFFT unit 1017, the parallel to serial converter 1019, the guard interval inserter 1021, the transmission beam generator 1023, the digital to analog converter 1025, the RF processor 1027 and the duplexer 1029 shown in FIG. 10, thus, a detailed description thereof will be omitted.

The feedback information processor 1125 analyzes the feedback information received in the mobile station receiver so as to detect the transmission weight values $\underline{w}_{T,k}$ included in the feedback information. In addition, the feedback information processor 1125 sends the detected transmission weight values $\underline{w}_{T,k}$ to the transmission beam generator 1123. A procedure of receiving the feedback information in the mobile station receiver will be described later, so a detailed description thereof will now be omitted. The transmission beam generator 1123 creates the transmission beam corresponding to the transmission weight values $\underline{w}_{T,k}$.

The receiver of the mobile station (that is, the mobile station receiver) of the OFDM mobile communication system will be described.

The mobile station receiver includes an RF processor 1139, an analog to digital converter 1141, a reception beam generator 1143, a signal processor 1145, a guard interval remover 1147, a serial to parallel converter 1149, an FFT unit 1151, a pilot symbol extractor 1153, a synchronization & channel estimator 1155, an equalizer 1157, a parallel to serial converter 1159, and a symbol demapper 1161. The operation and the structure of the RF processor 1139, the analog to digital converter 1141, the reception beam generator 1143, the signal processor 1145, the guard interval remover 1147, the serial to parallel converter 1149, the FFT unit 1151, the pilot symbol extractor 1153, the synchronization & channel estimator 1155, the equalizer 1157, the parallel to serial converter 1159, and the symbol demapper 1161 are identical to the operation and the structure of the RF processor 1037, the analog to digital converter 1039, the reception beam generator 1041, the signal processor 1043, the guard interval remover 1047, the serial to parallel converter 1049, the FFT unit 1051, the pilot symbol extractor 1053, the synchronization & channel estimator 1055, the equalizer 1057, the parallel to serial converter 1059, and the symbol demapper 1061 shown in FIG. 10, thus, a detailed description thereof will be omitted. The reception data finally output from the symbol demapper 1161 is the feedback information including the transmission weight values $\underline{w}_{T,k}$, and the feedback information output from the symbol demapper 1161 is input to the feedback information processor 1125.

FIG. 11 shows a case in which the mobile station receiver receives the feedback information and the mobile station transmitter creates the transmission beam by using the transmission weight values $\underline{w}_{T,k}$ included in the feedback information. However, the mobile station receiver and the mobile station transmitter can be used as the base station receiver and the base station transmitter. It is noted that the above description has been made in view of reception of the feedback information including the transmission weight values $\underline{w}_{T,k}$ with reference to FIG. 3.

As described above, according to the present invention, the weight values can be created through the two-step weight value creation method, in which the weight values are created through the CM scheme in the signal convergence step and the weight values are created through the DD scheme in the signal stabilization step, thereby rapidly creating the weight values having a minimum MSE value. Accordingly, it is possible to precisely create the reception beam, so that desired signals are only received in the receiver, thereby improving the system performance. In addition, according to the present invention, the transmission weight values, which are created in the receiver by using the reception weight values, can be transmitted to the transmitter in such a manner that the transmitter can use the transmission weight values. Accordingly, it is not necessary for the transmitter to perform a separate calculation process for calculating the transmission weight value, so that the load for the calculation process can be reduced.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of transmitting/receiving signals in a mobile communication system, the method comprising the steps of:
   i) calculating in a first receiver a reception weight value for creating a reception beam of the first receiver based on a reception signal and calculating in the first receiver a transmission weight value for creating a transmission beam of a first transmitter of a counter part based on the reception weight value;
   ii) creating in the first receiver feedback information including the transmission weight value; and
   iii) transmitting in a second transmitter the feedback information to a second receiver of the counter part,
   wherein the reception weight value is calculated based on the reception signal and an output signal created by applying the reception beam to the reception signal, by using one of a Constant Modulus (CM) scheme and a Decision-Directed (DD) scheme.

2. The method as claimed in claim 1, wherein step i) includes the substeps of:
   calculating the reception weight value through the CM scheme, when a differential error value between an error value of a present time point and an error value of a previous time point exceeds an absolute value of a first predetermined critical value, or the error value of the present time point is greater than or equal to a second predetermined critical value; and
   calculating the reception weight value through the DD scheme, when the differential error value between the error value of the present time point and the error value of the previous time point is less than or equal to the absolute value of the first predetermined critical value, and the error value of the present time point is less than the second predetermined critical value.

3. The method as claimed in claim 2, wherein each of the error values is a mean square value representing a difference between a desired signal required by the receiver and an original signal.

4. The method as claimed in claim 2, wherein each of the error values is a mean square error value representing a difference between a desired signal required by the receiver and an original signal.

5. A method of transmitting/receiving signals in a mobile communication system, the method comprising the steps of:
   i) receiving by a first receiver feedback information transmitted from a first transmitter of a counter part;
   ii) detecting by a second transmitter a transmission weight value from the feedback information to create a transmission beam; and iii) creating the transmission beam of the second transmitter corresponding to the detected transmission weight value and transmitting by the second transmitter a signal to a second receiver of the counter part by applying the transmission beam to the signal, wherein the transmission weight value is calculated in the second receiver of the counter part based on a reception weight value for creating a reception beam for the second receiver of the counter part, wherein the reception weight value is calculated based on a reception signal and an output signal created by the reception beam to the reception signal, by using one of a Constant Modulus (CM) scheme and a Decision-Directed (DD) scheme.

6. A method of transmitting/receiving signals in a mobile communication system, the method comprising the steps of:

i) calculating by a first receiver of a first apparatus a reception weight value for creating a reception beam of the first receiver based on a reception signal and calculating by the first receiver a transmission weight value for creating a transmission beam of a second transmitter of a second apparatus based on the reception weight value;

ii) creating by the first receiver feedback information including the transmission weight value;

iii) transmitting by a first transmitter of the first apparatus the feedback information to a second receiver of the second apparatus;

iv) receiving by the second receiver the feedback information transmitted from the first transmitter; and v) detecting by the second transmitter the transmission weight value from the feedback information received in the second receiver, creating by the second transmitter the transmission beam corresponding to the detected transmission weight value, and transmitting by the second transmitter a signal to the first receiver by applying the transmission beam to the signal, wherein the reception weight value is calculated based on the reception signal and an output signal created by applying the reception beam to the reception signal, by using one of a Constant Modulus (CM) scheme and a Decision-Directed (DD) scheme.

7. The method as claimed in claim 6, wherein step i) includes the substeps of:

calculating the reception weight value through the CM scheme, when a differential error value between an error value of a present time point and an error value of a previous time point is greater than an absolute value of a first predetermined critical value, or the error value of the present time point is equal to or greater than a second predetermined critical value; and calculating the reception weight value through the DD scheme, when the differential error value between the error value of the present time point and the error value of the previous time point is equal to or less than the absolute value of the first predetermined critical value and the error value of the present time point is less than the second predetermined critical value.

8. The method as claimed in claim 7, wherein each of the error values is a mean square value representing a difference between a desired signal required by the first receiver and an initial signal.

9. The method as claimed in claim 7, wherein each of the error values is a mean square error value representing a difference between a desired signal required by the first receiver and an initial signal.

10. A system for transmitting/receiving signals in a mobile communication system, the system comprising:

a signal processor for calculating a reception weight value for creating a reception beam of a first receiver based on a reception signal and calculating a transmission weight value for creating a transmission beam of a first transmitter of a counter part based on the reception weight value;

a feedback information generator for creating feedback information including the transmission weight value; and a second transmitter for transmitting the feedback information to a receiver of the counter part, wherein the reception weight value is calculated based on the reception signal and an output signal created by applying the reception beam to the reception signal, by using one of a Constant Modulus (CM) scheme and a Decision-Directed (DD) scheme.

11. The system as claimed in claim 10, wherein the signal processor calculates the reception weight value through the CM scheme, when a differential error value between an error value of a present time point and an error value of a previous time point is greater than an absolute value of a first predetermined critical value, or the error value of the present time point is greater than or equal to a second predetermined critical value, and calculates the reception weight value through the DD scheme, when the differential error value between the error value of the present time point and the error value of the previous time point is less than or equal to the absolute value of the first predetermined critical values and the error value of the present time point is less than the second predetermined critical value.

12. A system for transmitting/receiving signals in a mobile communication system, the system comprising:

a first receiver for receiving feedback information transmitted from a first transmitter of a counter part;

a feedback information processor for detecting a transmission weight value from the feedback information to create a transmission beam;

a transmission beam generator for creating the transmission beam corresponding to the detected transmission weight value; and a second transmitter for transmitting a signal to a second receiver of the counter part by apply the transmission beam to the signal, wherein the transmission weight value is calculated in the second receiver of the counter part based on a reception weight value for creating a reception beam for the second receiver of the counter part, wherein the reception weight value is calculated based on a reception signal and an output signal created by applying the reception beam to the reception signal, by using one of a Constant Modulus (CM) scheme and a Decision-Directed (DD) scheme.

13. A mobile communication system, the mobile communication system comprising:

a first apparatus including a first transmitter and a first receiver; and a second apparatus including a second transmitter and a second receiver, wherein the first receiver calculates a reception weight value for creating a reception beam of the first receiver based on a reception signal and calculates a transmission weight value for creating a transmission beam of the second transmitter based on the reception weight value, thereby creating feedback information including the transmission weight value, the first transmitter transmits the feedback information to the second receiver, the second receiver receives the feedback information transmitted from the first transmitter, and the second transmitter detects the transmission weight value from the feedback information received in the second receiver, and creates the transmission beam corresponding to the detected transmission weight value in order to transmit a signal to the first receiver by applying the transmission beam to the signal, and wherein the reception weight value is calculated based on the reception signal and an output signal created by applying the reception beam to the reception signal, by using one of a Constant Modulus (CM) scheme and a Decision-Directed (DD) scheme.

14. The mobile communication system as claimed in claim 13, wherein the first receiver includes:

a signal processor for calculating the reception weight value through the CM scheme, if a differential error value between an error value of a present time point and an error value of a previous time point is greater than an absolute value of a first predetermined critical value, or the error value of the present time point is greater than or equal to a second predetermined critical value, and for calculating the reception weight value through the DD scheme, if the differential error value between the error value of the present time point and the error value of the previous time point is less than or equal to the absolute value of the first predetermined critical value and the error value of the present time point is less than the second predetermined critical value;

a feedback information generator for receiving the transmission weight value and creating feedback information including the transmission weight value, and a reception beam generator for creating the reception beam by using the reception weight value.

15. The mobile communication system as claimed in claim 13, wherein the second transmitter includes a feedback information processor for detecting the transmission weight value from the feedback information received in the second receiver, and a transmission beam generator for creating the transmission beam corresponding to the detected transmission weight value.

16. The mobile communication system as claimed in claim 14, wherein each of the error values is a mean square value representing a difference between a desired signal required by the first receiver and an initial signal.

17. The mobile communication system as claimed in claim 14, wherein each of the error values is a mean square error value representing a difference between a desired signal required by the first receiver and an initial signal.

* * * * *